US006286004B1

(12) United States Patent
Yoshiura et al.

(10) Patent No.: US 6,286,004 B1
(45) Date of Patent: Sep. 4, 2001

(54) DISTRIBUTED TYPE OF DATABASE SYSTEM, CONSISTENCY MANAGING METHOD FOR THE SAME, AND A COMPUTER-READABLE RECORDING MEDIUM WITH A PROGRAM FOR MAKING A COMPUTER EXECUTE EACH STEP OF THE METHOD STORED THEREIN

(75) Inventors: Yukari Yoshiura; Atsushi Iizawa; Takashi Yano, all of Tokyo; Kaoru Maeda, Chiba; Tetsuya Ikeda, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/206,294

(22) Filed: Dec. 7, 1998

(30) Foreign Application Priority Data

Dec. 12, 1997 (JP) .................................................... 9-343394
Apr. 27, 1998 (JP) .................................................. 10-116451

(51) Int. Cl.[7] ......................................................... G06F 17/30
(52) U.S. Cl. ............................... 707/10; 707/8; 707/202; 707/204; 707/203
(58) Field of Search ................................ 707/8, 204, 202, 707/203, 10, 24

(56) References Cited

U.S. PATENT DOCUMENTS

| | | | |
|---|---|---|---|
| 5,280,612 | * 1/1994 | Lorie et al. | 707/8 |
| 5,535,211 | 7/1996 | Yano | 370/447 |
| 5,581,753 | * 12/1996 | Terry et al. | 707/201 |
| 5,631,905 | 5/1997 | Yano | 370/462 |
| 5,765,171 | * 6/1998 | Gehani et al. | 707/203 |
| 5,864,851 | * 1/1999 | Breitbart et al. | 707/8 |
| 6,038,563 | * 3/2000 | Bapat et al. | 707/10 |
| 6,085,191 | * 7/2000 | Fisher et al. | 707/9 |
| 6,098,078 | * 8/2000 | Gehani et al. | 707/203 |

FOREIGN PATENT DOCUMENTS

| | | |
|---|---|---|
| 4-48348 | 2/1992 | (JP) . |
| 4-335451 | 11/1992 | (JP) . |
| 5-227249 | 9/1993 | (JP) . |
| 6-161859 | 6/1994 | (JP) . |

OTHER PUBLICATIONS

Bohannon et al., Distributed Multi–Level Recovery in Main–Recovery Databases, 1996, IEEE, pp. 44–55.*
Yukari Shirota, et al., "A Study of Concurrency Control Methods on Information Broadcasting," Research Report of Information Processing Society, ISSN, Jul. 15, 1997, vol. 97 No. 64, pp.269–274, (With Partial English Translation).
Atsushi Iizawa, et al., "Very Large Distributed Database Systems for Information Broadcasting", Research Report of Information Processing Society, ISSN, Jul. 15, 1997, vol. 97, No. 64, pp. 263–268, (With Partial English Translation).

* cited by examiner

*Primary Examiner*—Thomas Black
*Assistant Examiner*—Frantz Coby
(74) *Attorney, Agent, or Firm*—Oblon, Spivak, McClelland, Maier & Neustadt, P.C.

(57) ABSTRACT

A distributed type of database system according to the present invention comprises a communication line for transmitting, when a transaction is generated in any of a plurality of DB sites, a request message for requesting permission of updating from the DB site to a broadcasting station site. After receiving the message, it is determined in the broadcasting station site whether a permission for updating should be given or not. The result of the determination is transmitted to all the DB sites in the broadcasting mode through a satellite.

21 Claims, 17 Drawing Sheets

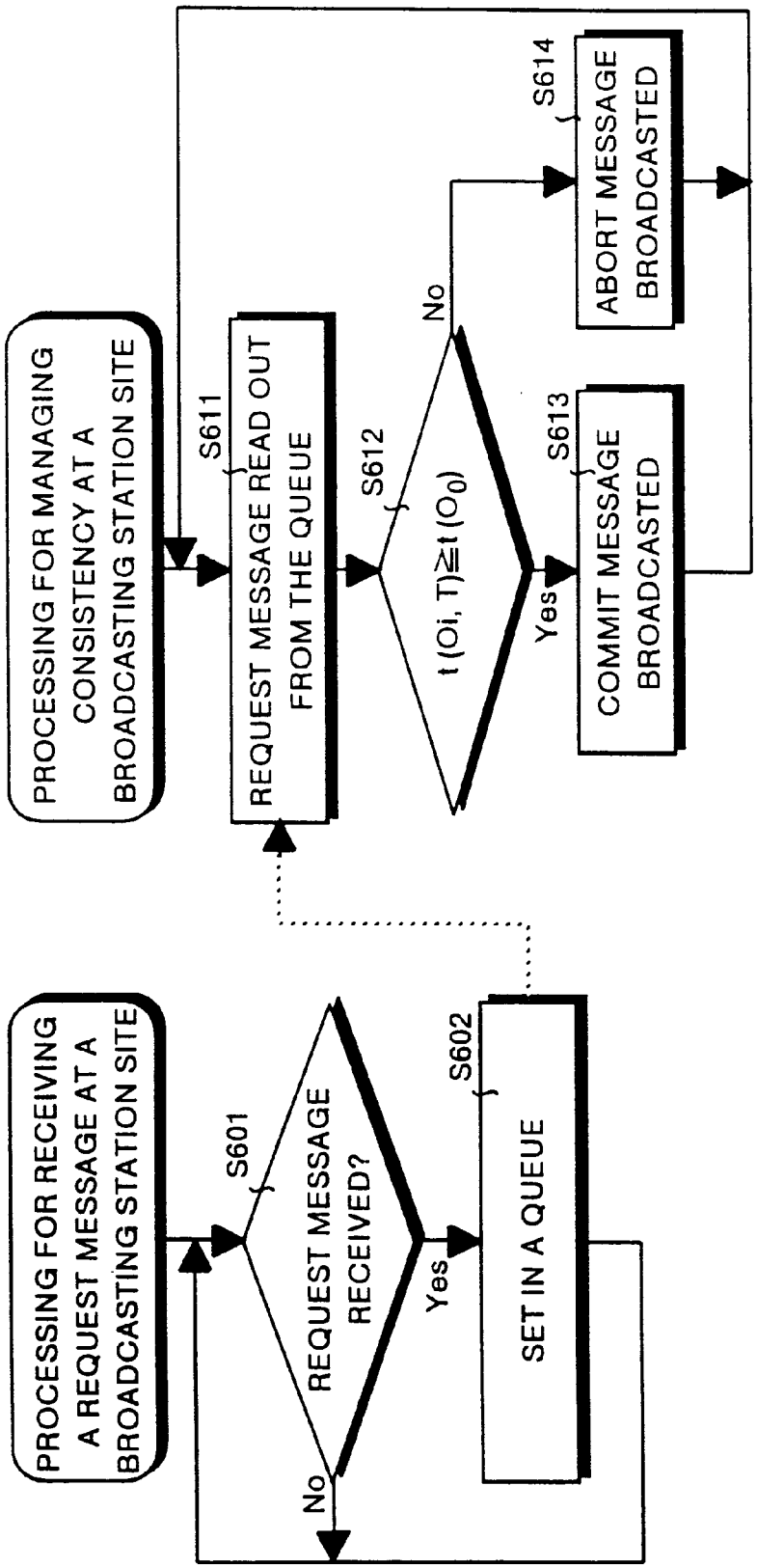

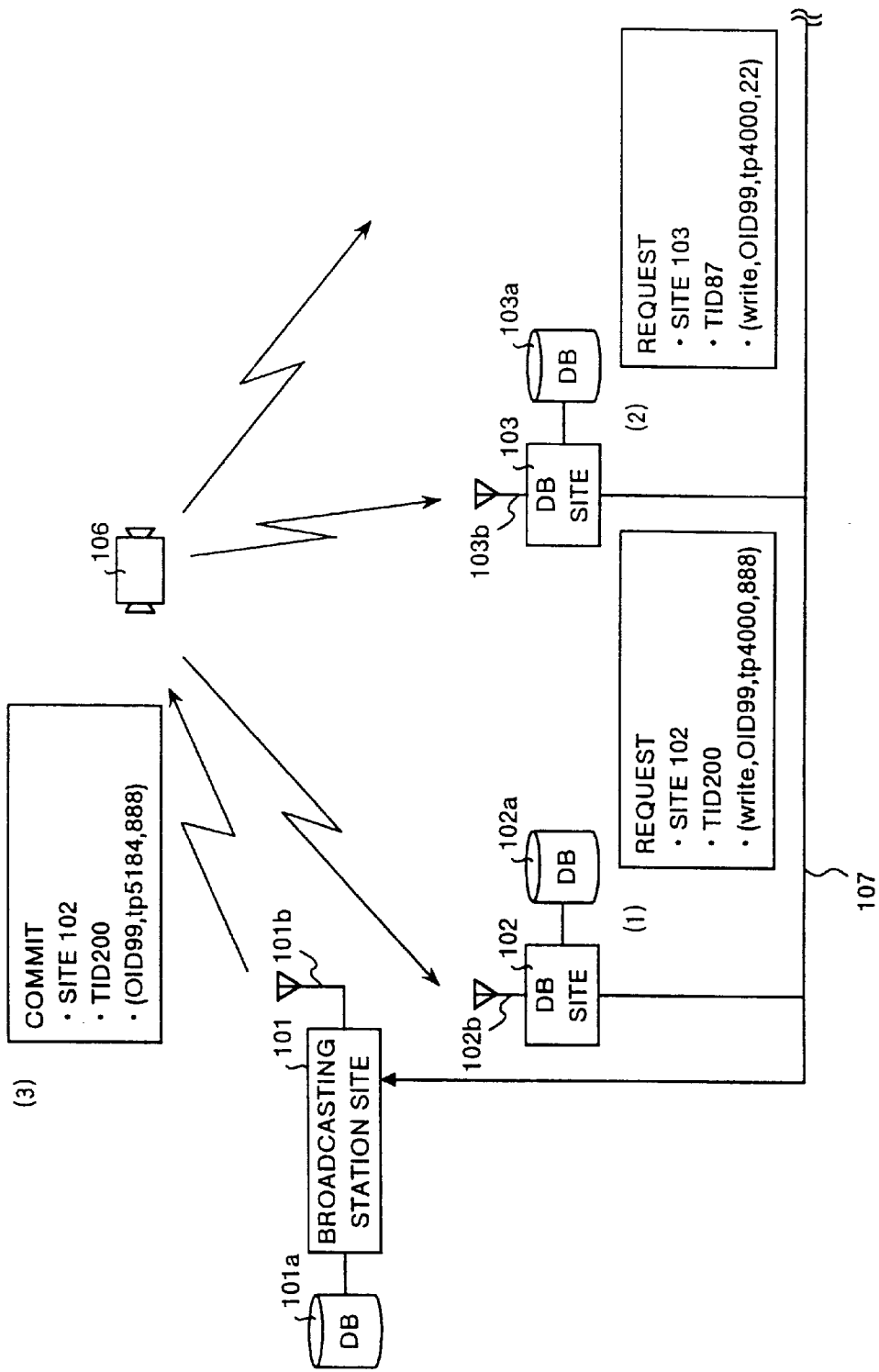

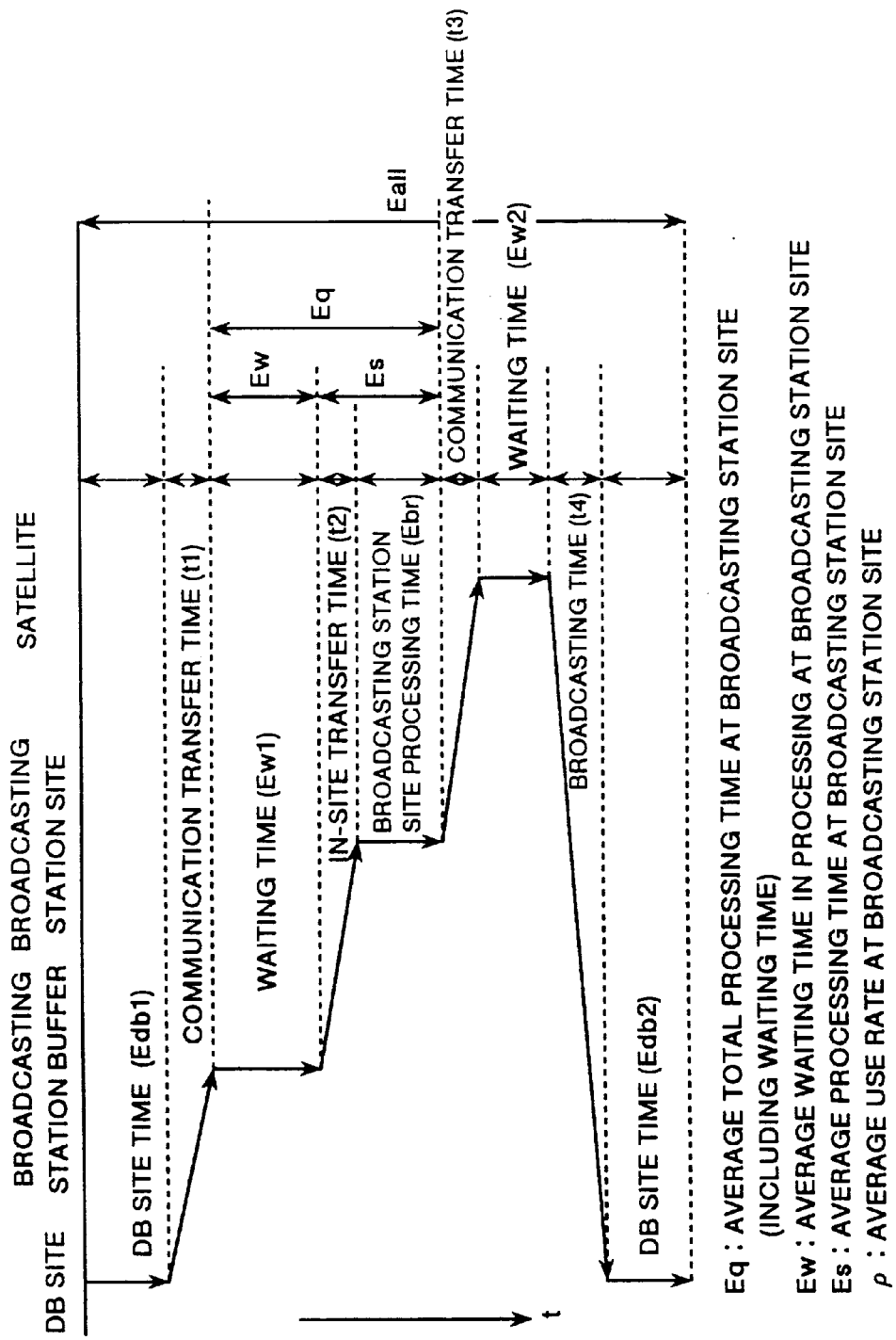

| 400 |
|---|
| ABORT |
| • SITE ID |
| • TRANSACTION ID |
| • LIST OF PAIR VALUES EACH CONSISTING OF (TARGET OBJECT ID, LATEST VALUE STORING SITE ID INFORMATION ) |

DISTRIBUTED TYPE OF DATABASE SYSTEM, CONSISTENCY MANAGING METHOD FOR THE SAME, AND A COMPUTER-READABLE RECORDING MEDIUM WITH A PROGRAM FOR MAKING A COMPUTER EXECUTE EACH STEP OF THE METHOD STORED THEREIN

FIELD OF THE INVENTION

The present invention relates to a distributed type of database system enabling consistency management to prevent generation of contradiction in copied data even in an extremely large scale database system extending over extremely large number of sites, a consistency managing method for the same, and a computer-readable recording medium with a program for making a computer execute each step of the method recorded therein.

BACKGROUND OF THE INVENTION

In a distributed type of database system, copied data for an object is distributed among a plurality of sites, and a plurality of transactions are concurrently executed. Therefore, it is very important to preserve consistency of copied data distributed over the system.

As one example of consistency managing method in a distributed type of database system based on the conventional technology, there is a so-called optimistic control system based on time stamps provided under centralized management (described as "optimistic control system" hereinafter). FIG. 21 is a block diagram showing general configuration of a distributed type of database system realizing the optimistic control system. This distributed type of database system comprises a main site 2100 having master data, and a plurality of database (DB) sites 2101 to 2104 each having copied data generated from the master data. The main site 2100 centralizedly manages consistency of the master data and copied data. When transaction for updating is generated in any of the DB sites 2101 to 2104, the DB sites 2101 to 2104 can not update copied data stored in the site before updating is permitted by the main site 2100.

Processing in the optimistic control system consists of three phases of read-out phase, check phase and write phase. Generally, in the read-out phase, data is read out and written in only a private area for transaction (in other words, work area). In the check phase, checking is executed for any conflict with other transaction for insuring the possibility of serialization. Further, in the write phase, when updating is permitted as a result of checking in the check phase, updated data is permanently written in a database at each of the DB sites 2101 to 2104, and when updating is not permitted, the transaction is aborted.

The read-put phase, check phase and write phase are specifically described with reference to FIG. 21. For instance, when transaction for updating is generated in the DB site 2101, the DB site 2101 reads out the copied data to be updated into the private area for transaction and updates the read-out copied data in the private area for transaction (read-out phase). Then the DB site 2101 transmits an updating request information including a value after updating to the main site 2100. In response to the request for updating from the DB sites 2101, the main site 2100 plays a role as an arbitrator for any conflicting request for updating and determines whether the request for updating is to be permitted or not (check phase). When the main site 2100 permits the request for updating, the DB site 2101 updates copied state stored in the site and executes processing for permanently writing the updated copied data (write phase). On the other hand, when the request for updating is not permitted because of any conflicting request for updating, the DB site 2101 aborts the generated transaction.

The main site 2100 determines whether the request for updating is to be permitted or not according to a time stamp given to the data to be updated. In addition, the main site 2100 updates, when permitting the request for updating, the master data, and transmits a value after updating also to the DB sites 2102 to 2104 other than the DB site 2101 having transmitted the request for updating. As a result, also in the DB sites 2102 to 2104, the corresponding copied data is updated using the value after updating transmitted from the main site 2100. Thus a consistency of data is maintained in the entire system. In other words, the possibility of serializing data is insured in the check phase described above, and enhanced consistency management is enabled for preventing generation of contradictions among data.

In the optimistic control system described above, as the centralized management system is employed, the authorized latest value is preserved in the main site 2100. Therefore, when data consistency is checked in the check phase in the optimistic control system, each of the DB sites 2101 to 2104 is required only to issue an inquiry to the main site 2100 and it is not required to lock other copied data. In addition, even when any of the DB sites is down, there is a advantage that the DB site can be ignored to continue the processing.

In the conventional technology as described above, data consistency over a system as a whole can be preserved. However, when an extremely large distributed type of database system extending over an extremely large number of database sites is constructed, it is physically impossible to deliver, each time data is updated, information indicating updating of the data to each of the extremely large number of distributed DB sites from the main site.

Furthermore, in the conventional technology as described above, when a data is updated, there is generated a time lag in delivery of information indicating updating of the data between a DB site that receives the updated data first and a DB site that receives the updated data last. Therefore, consistency management capable of suppressing generation of data contradiction in the entire system at an arbitrary point of time is physically impossible.

In addition, as the main site arbitrates conflicts among requests for updating from a plurality of DB sites, in an extremely large distributed type of database system, work load on the main site remarkably increases. In other words, when a data is updated, the main site is required to transmit information indicating updating of the data to each of the DB sites, and in a case of an extremely large scale distributed type of database system extending over an extremely large number of database sites, work load on the main site remarkably and disadvantageously increases.

Furthermore, because of delay in processing due to remarkable increase of work load on the main site, sometimes transaction in each DB site may be aborted. In such a case, each DB site executes the same transaction again and this results in an increase of a number of unnecessary processing. Especially, in the time stamp-based optimistic control system, priority of transaction for updating in each DB site is determined according to a time stamp, and it is generally believed that the possibility of abortion of transaction is higher as compared to the lock system in which an earlier request for updating is preferentially treated.

In addition, although arbitration for solving conflict among request for updating is executed according to a time stamp, however, there is no global time in each site in a distributed type of database system. Therefore, when time clock used for management in each DB site is not coincident, time of updating of data does not always indicate which data is new or old, which makes it impossible to preserve consistency among data.

SUMMARY OF THE INVENTION

It is a first object of the present invention to enable enhanced consistency management capable of preventing generation of contradiction among data even in an extremely large scale distributed type of database system that extends over an extremely large number of database sites.

It is a second object of the present invention to enable reduction of work load on the main site, even in a case where centralized management in which only the main site can permit updating of data is employed.

It is a third object of the present invention to reduce a number of aborted transactions and improve the processing efficiency in the main site as well as in each DB site by employing centralized management by the main site for making it possible for each DB site to check conflict among a plurality of requests for updating.

It is a fourth object of this invention to enable consistency management according to common time clock even in a extremely large scale distributed type of database system extending over an extremely large number of DB sites.

In the distributed type of database system according to the present invention, a one-to-one information transmitting unit transmits, when transaction is generated in the first sites, updating permission request information for requiring permission of updating of the copied data for the arbitrary object stored therein from each of the first sites to the second site; and a one-to-many information transmitting unit receives the updating permission request information from the one-to-one information transmitting unit, determines whether the request for updating is to be permitted in the second site or not according to the received updated permission request information and management information for the object, and distributes a result of the determination from the second site to the plurality of sites in batch.

The consistency managing method for a distributed type of database system according to the present invention comprises; an updating permission requesting step of generating, when transaction is generated in one of the first sites, updating permission request information including information after updating for at least one object for which copied information is required to be updated, and transmitting the generated updated permission request information to the second site; an updating permission determining step of receiving the updating permission request information transmitted in the updating permission request step by the second site and making determination as to whether management information for the object is allowed to be updated or not according to the received message as well as to management information for the object; a updating permission/inhibition information generating step of updating, when it is determined in the updating permission determining step that management information for the object is allowed to be updated, management for the object, generating updating permission information including information for the objected after updating, and also generating, when it is determined in the updating permission determining step that the management information is not allowed to be updated, updating inhibition information; and a broadcasting/distributing step of distributing the updating permission information or updating inhibition information generated in the updating permission/inhibition information generating step from the second site to the plurality of first sites in the broadcasting mode.

Other objects and features of this invention will become apparent from the following description with reference to the accompanying drawings.

BRIEF DESCRIPTION OF THE DRAWING

FIG. 6A is a flow chart showing the processing for receiving a request message in the broadcasting station site in the distributed type of database system according to Embodiment 1 of the present invention;

FIG. 6B is a flow chart processing for consistency management in the broadcasting station site in the distributed type of database system according to Embodiment 1 of the present invention;

FIG. 7 is an explanatory view that shows the processing executed when there are two conflicting requests for updating of the same object in the distributed type of database system according to Embodiment 1 of the present invention;

FIG. 8 is an explanatory view showing an access operation sequence among each DB site, a broadcasting station site and a communication satellite for evaluating the distributed type of database system according to Embodiment 1 of the present invention;

DESCRIPTION OF THE PREFERRED EMBODIMENTS

Detailed description is made for embodiments of the distributed type of database system, the consistency managing method for the same, and a computer-readable recording medium with a program for making a computer execute each step of the method recorded therein each according to the present invention with reference to the attached drawing.

Description is made for a distributed type of database system according to Embodiment 1 in the order of:

(1) Configuration of the System,
(2) Consistency Management of Copied Data,
(3) Evaluation of the System, and
(4) Effects in Embodiment 1.

(1) Configuration of the System

Figure 1:
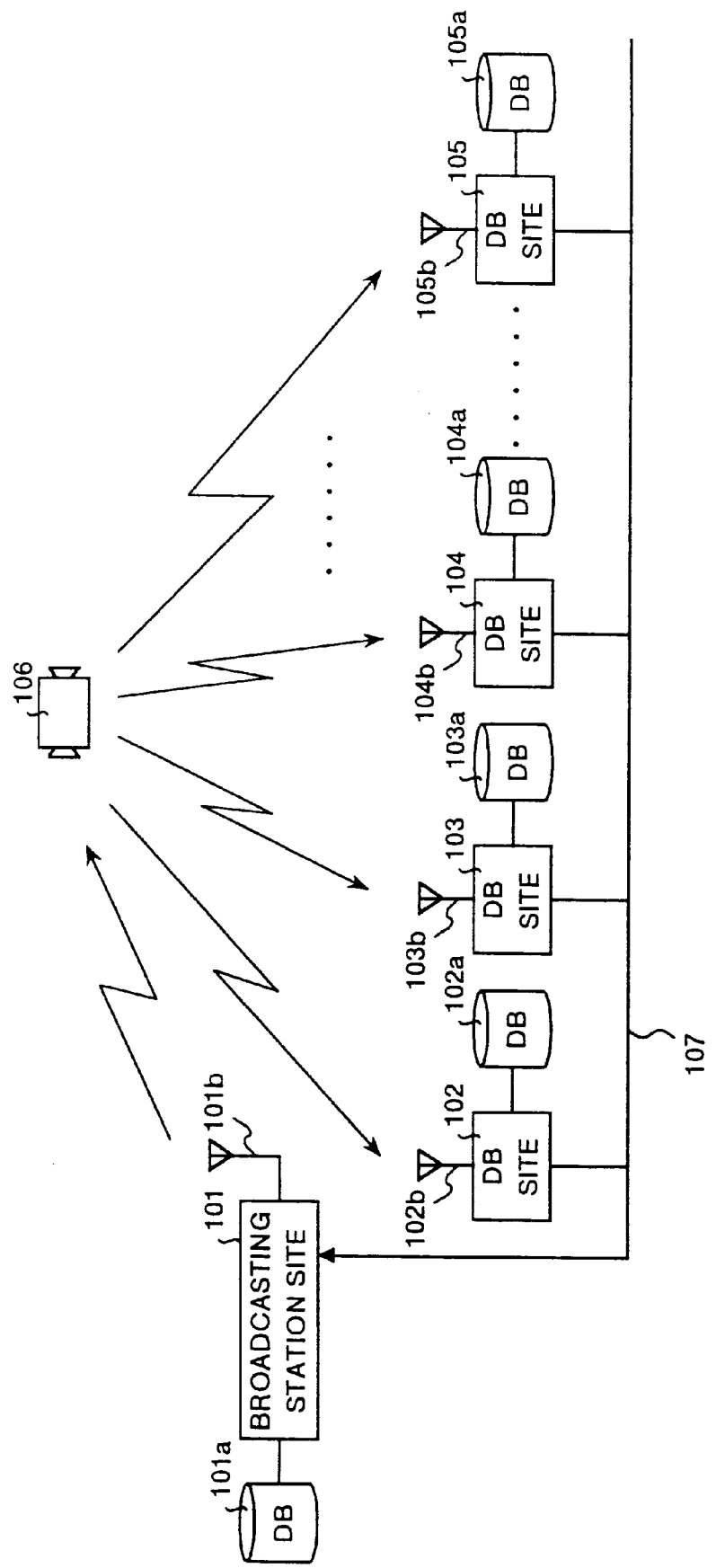
FIG. 1 is a conceptual view showing configuration of a distributed type of database system according to Embodiment 1 of the present invention.

FIG. 1 is a conceptual view showing configuration of a distributed type of database system according to Embodiment 1 of the present invention. The distributed type of database system shown in FIG. 1 comprises a broadcasting station site 101, a plurality of DB sites 102 to 105, a satellite 106 and communication line 107. The broadcasting station site 101 (main site: Corresponding to a second site in the present invention) manages the consistency in copied data for an arbitrary object existing in the system. The DB sites 102 to 105 (corresponding to a first site in the present invention) are widely distributed and each store therein copied data for an arbitrary object. The satellite 106 (corresponding to a 1-to-many support information transmitting unit and to a broadcasting facility in the present invention) broadcasts information indicating whether a request for updating is permitted or not from the broadcasting station site 101 to the DB sites 102 to 105. The communication line 107 (corresponding to a one-to-one information transmitting unit and to a communication line in the present invention) transmits a request for updating or the like from each of the DB sites 102 to 105 to the broadcasting station site 101.

The broadcasting station site 101 performs centralized management of consistency in copied data for an arbitrary object distributed to and managed by the DB sites 102 to 105. It comprises, a DB (database) 101a for storing therein management information prepared for each object and an antenna 101b used for distributing information to each of the DB sites 102 to 105 through the satellite 106. Each of the DB sites 102 to 105 comprises, similarly to the broadcasting station site 101, a database 102a to 105a respectively for storing therein copied data for an arbitrary object and antennas 102b to 105b respectively used for receiving information transmitted from the satellite 106.

At least an object ID (OID) for identifying an object of copied data distributed among the DB sites 102 to 105 and managed thereby and the latest time stamp for the object are included in management information which the broadcasting station site 101 stores therein. The broadcasting station site 101 may have copied data a latest value or master data of each object) for all objects existing in the system as one of the management information. However, if the broadcasting station site is made to hold copied data for all the objects, the size of the data is extremely enormous, which may be quite difficult to manage. Therefore, the broadcasting station site 101 does not accumulate copied data itself for each object, but manages consistency of copied data for the DB sites 102 to 105 by using management information including at least object IDs of objects as well as the latest time stamps of the objects. As a result, data amounts which the broadcasting station site 101 is required to manage can be reduced.

In addition, the broadcasting station site 101 generates a clock signal to synchronize time clocks among the DB sites 102 to 105 to each other, and distributes the signal to the DB sites 102 to 105 all the time in the broadcasting mode (corresponding to a step of distributing a clock signal in the present invention). This clock signal is used, as described later, as a time stamp for each object.

Figure 20:
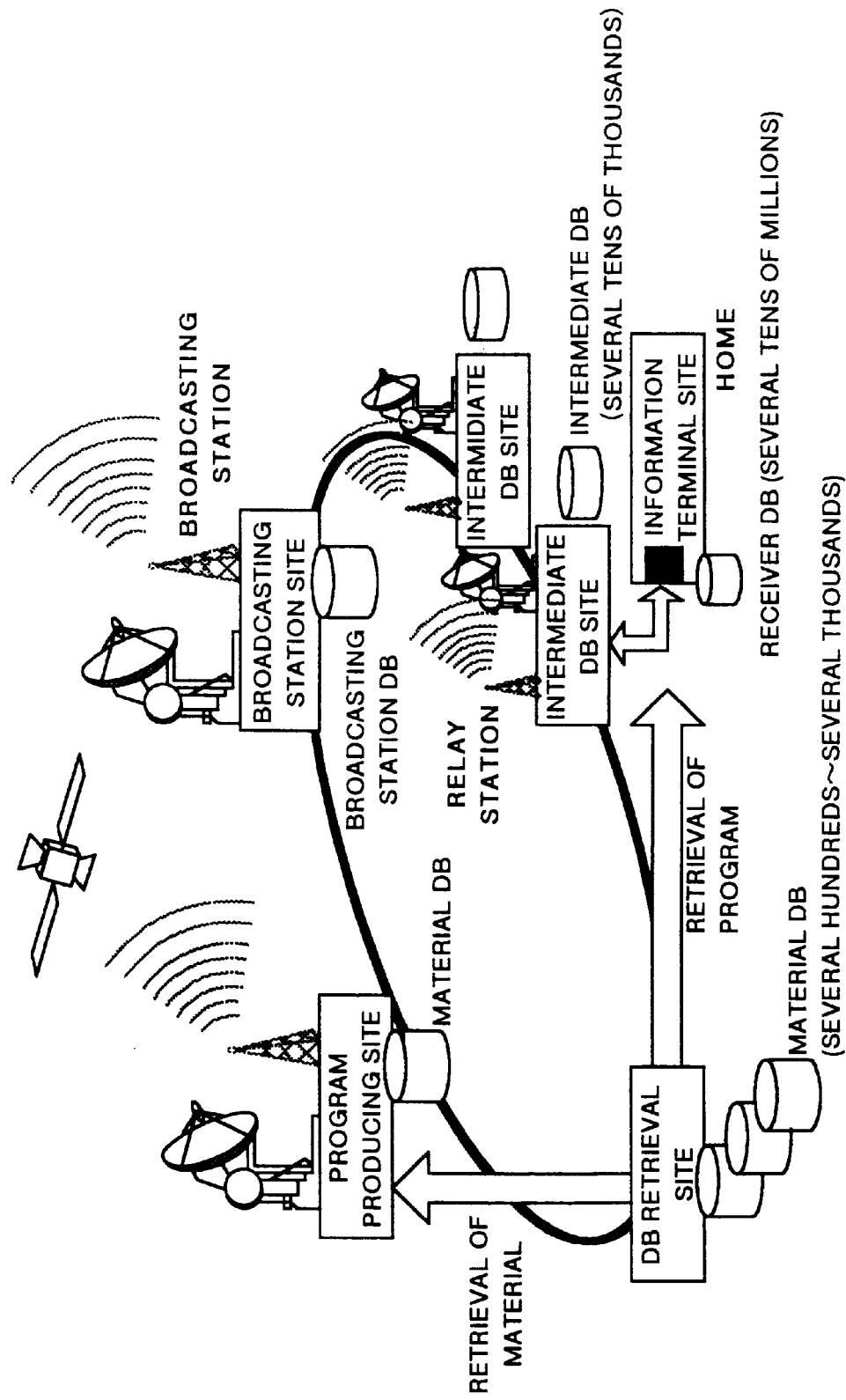
FIG. 20 is an explanatory view for illustrating an example of construction of the distributed type of database system according to Embodiment 2 of the present invention.
Figure 21:
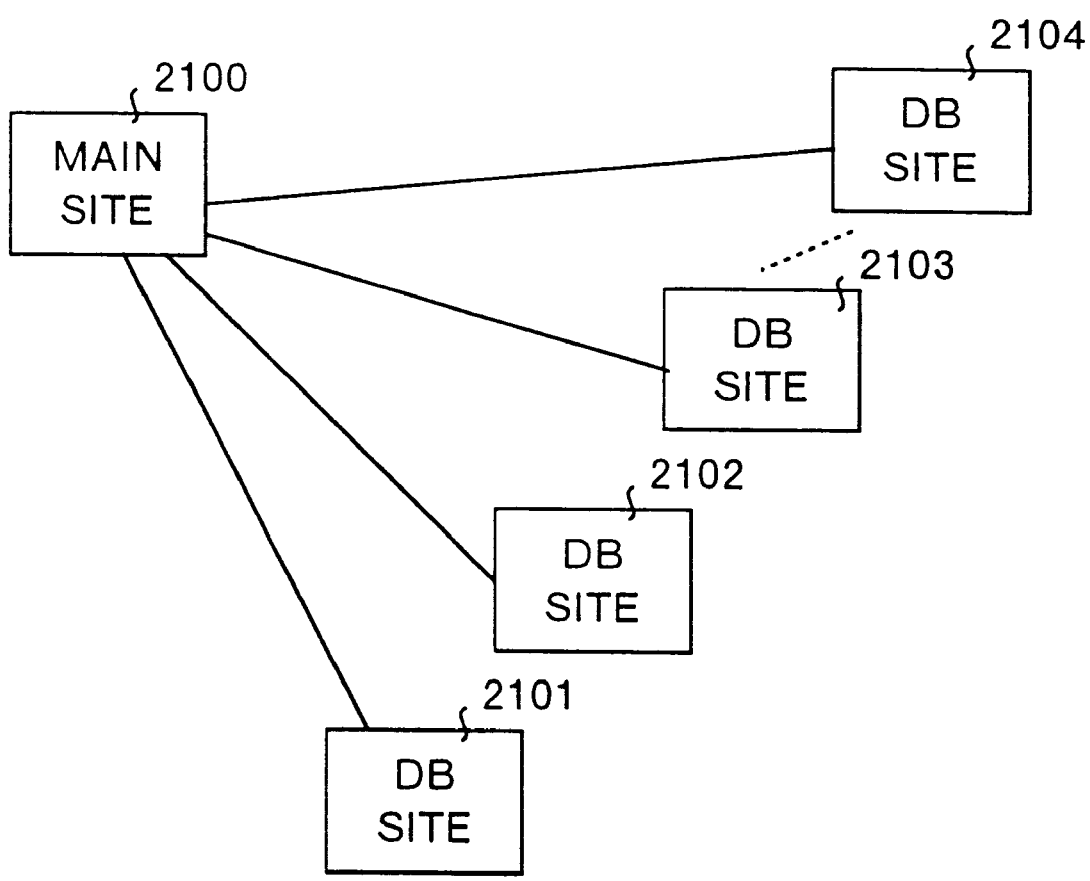
FIG. 21 is a block diagram showing a distributed type of database system that shows the time stamp-based optimistic control system executed under centralized management.

Although FIG. 1 shows one site as the broadcasting station site 101, the broadcasting station site 101 may comprise at east one DB site for managing master data for objects and supplying information to each of the DB sites 102 to 105, and at least one DB site having management information to manage copied data in the system (Refer to the description related to FIG. 20). Namely, in Embodiment 1, the broadcasting station site 101 may enable distribution of a massage to the DB sites 102 to 105 in the broadcasting mode and management of consistency of copied data which each of the DB sites 102 to 105 has no matter how the broadcasting station site 101 is configured or no matter what data the broadcasting station site 101 stores.

If the broadcasting station site 101 is designed not to manage latest values of objects, and if the DB sites 102 to 105 require a latest value of a particular object, it is required to copy the latest value of a corresponding object from other DB site. Therefore, the broadcasting station site 101 manages site IDs storing latest values of objects, and may inform a DB site that has the latest value of the object to the DB sites 102 to 105. It should be noted that, as a DB site having a latest value of an object, a DB site which requests updating of an object and from which the updating is permitted by the broadcasting site 101 can be considered. In addition, which is a DB site having a latest value of a particular object can be identified by a method explained in the embodiment described later.

The DB sites 102 to 105 are not required to store therein copied data for all the objects existing in the system and may hold only copied data for a required object.

In the description below, "communication" or "transmission" means transmission of various types of message through the communication line 107, and "broadcast" or "distribution" means transmission of various types of message through the satellite 106. It is assumed in the distributed type of database system according to Embodiment 1 that information is distributed from the broadcasting station site 101 to the DB sites 102 to 105 by using the satellite 106. However, a satellite is not required when ground waves are used. On the other hand, a request for updating may be broadcasted from each of the DB sites 102 to 105 to the broadcasting station site 101.

Furthermore, FIG. 1 shows only the case where the DB sites 102 to 105 are provided under the broadcasting station site 101, but a hierarchical structure can be formed by further providing a plurality of DB sites under each of the DB sites. In this case, each high-order DB site can also be operated as a main site (host site) for low-order DB sites.

(2) Consistency Management of Copied Data

Detailed description is made for an operation of the distributed type of database system according to Embodiment 1, namely for a consistency managing method of copied data in the distributed type of database system in the order of:

① Outline of Processing,
② Concrete Example of Processing, and
③ Modification of Processing.

① Outline of Processing

At first, outline of a consistency managing method of the distributed type of database system according to Embodiment 1 is described. The distributed type of database system according to Embodiment 1 can realize enhanced consistency management in an extremely large scale distributed type of database extending over an extremely large number of database sites by employing an optimistic control system described in the section on the conventional technology and using distribution based on broadcasting for a check phase in this optimistic control system. It should be noted that soft consistency management can naturally be realized.

Figure 2:
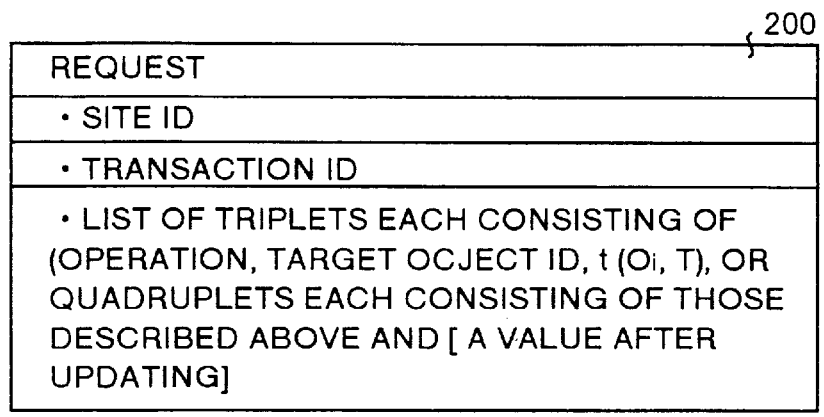
FIG. 2 is an explanatory view that shows a request message transmitted from a DB site to a broadcasting station site through communications in the distributed type of database system according to Embodiment 1 of the present invention.

Each of the DB sites 102 to 105 transmits, according to generated transaction, the request message 200 shown in FIG. 2 to the broadcasting station site 101 by means of communications through the communication line 107, and requests permission of updating on an arbitrary object.

Figure 3:
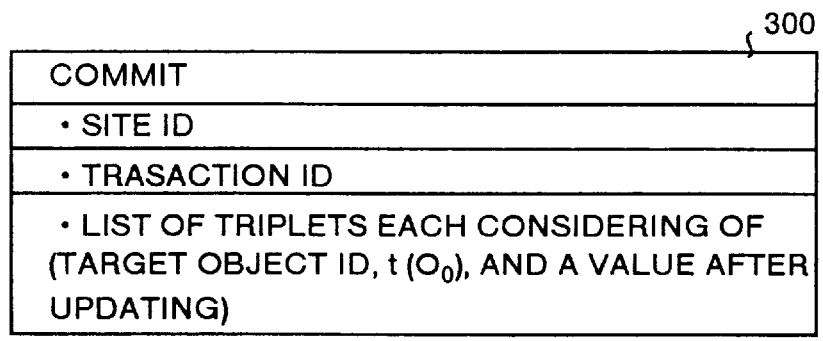
FIG. 3 is an explanatory view that shows a commit message broadcasted by the broadcasting station site to each DB site when a request for updating is permitted by the broadcasting station site in the distributed type of database system according to Embodiment 1 of the present invention.
Figure 4:
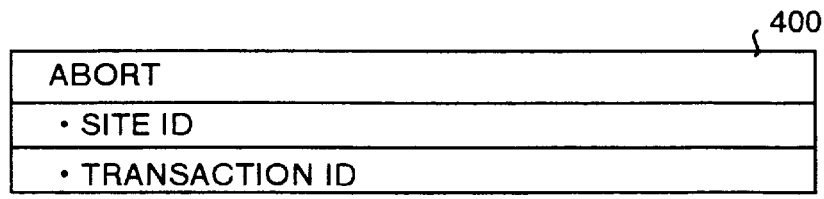
FIG. 4 is an explanatory view that shows an abort message broadcasted by the broadcasting station site to each DB site when a request for updating is not permitted by the broadcasting station site in the distributed type of database system according to Embodiment 1 of the present invention.

The broadcasting station site 101 plays a role as an arbitrator for any conflicting request for updating. A result of determination as to whether the request for updating from any of the DB sites 102 to 105 is permitted or not in the broadcasting station site 101 is distributed in batch from the broadcasting station site 101 to the DB sites 102 to 105 in the broadcasting mode. Specifically, when the request for updating is permitted, a commit message 300 shown in FIG. 3 is distributed, and when the request for updating is not permitted, an abort message 400 shown in FIG. 4 is distributed. As a value after updating is also included in the commit message 300, the DB sites 102 to 105 can learn updated contents executed in the system. When the DB sites 102 to 105 receive a commit message 300 from the broadcasting station site 101, the DB site/s that had requested for a permission updates the corresponding copied data with the contents (a value after updating stored in the site) having been requested for updating. Remaining DB sites update copied data with the value after updating included in the commit message 300. As a result, one commit message 300 is distributed from the broadcasting station site 101 in the broadcasting mode, and the copied data for an object of which permission of updating has been requested in all the DB sites 102 to 105 is updated with the latest value, and for this reason consistency of the copied data can be maintained.

On the other hand, when the DB sites 102 to 105 receive the abort message 400 from the broadcasting station site 101, and if the abort message 400 is addressed to own, the site aborts the corresponding transaction, but ignores the abort message 400 when it is addressed to some other site.

As described above, in the distributed type of database system according to Embodiment 1, when it is tried to transmit a request for updating, the broadcasting station site 101 and each of the DB sites 102 to 105 are connected based on a relation of one to one through the communication line 107. On the other hand, when it is tried to transmit information indicating whether a request for updating is permitted or not, the broadcasting station site 101 and the DB sites 102 to 105 are connected based on a relation of one to multiple through the satellite 106.

② Specific Example of Processing

Figure 5A:
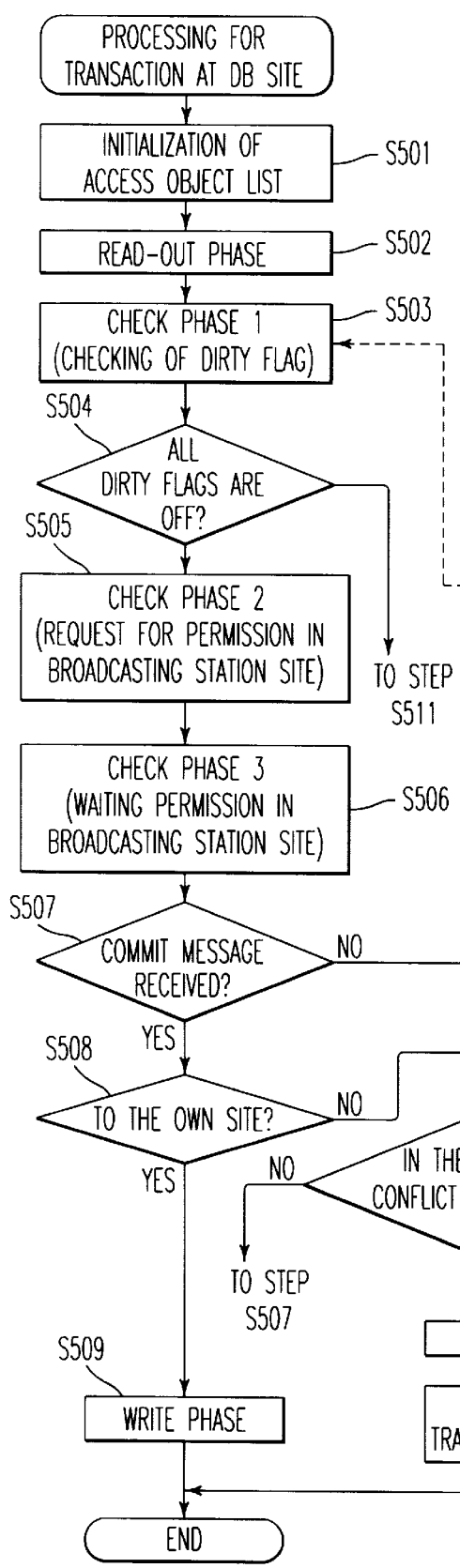
FIG. 5A is a flow chart showing transaction processing in a DB site in the distributed type of database system according to Embodiment 1 of the present invention.
Figure 5B:
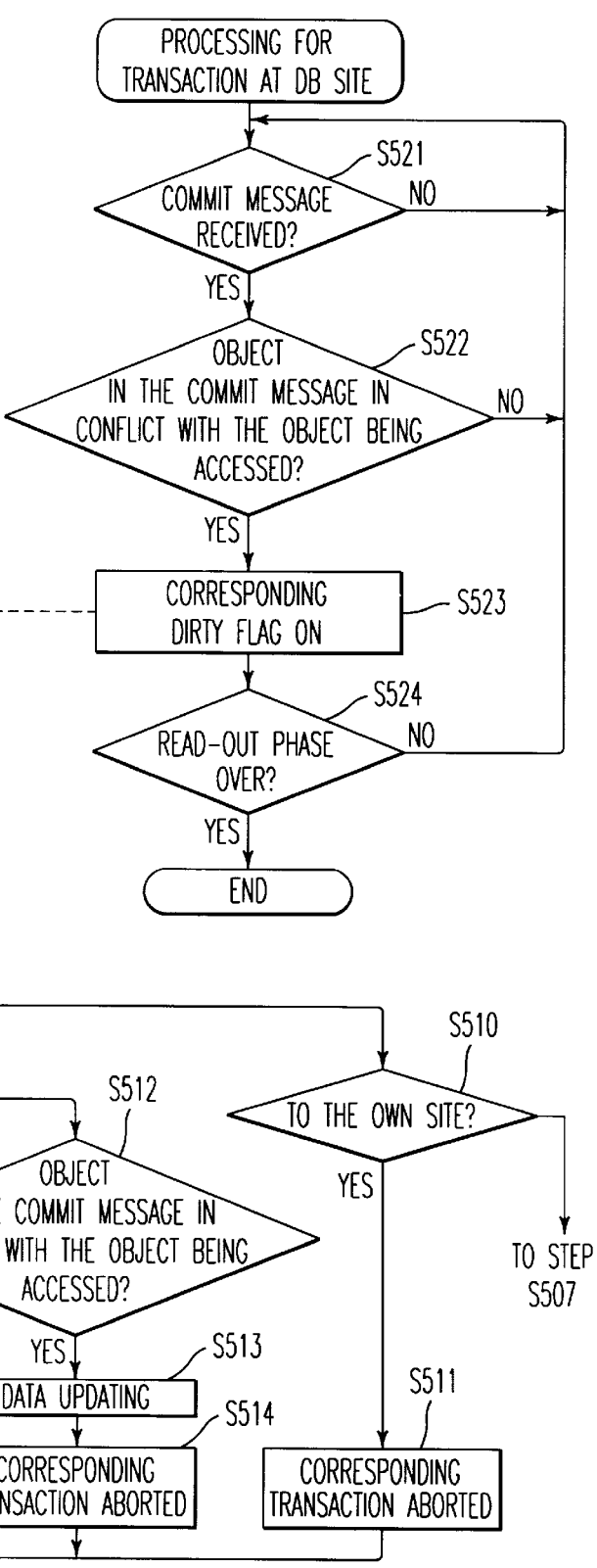
FIG. 5B is a flow chart showing flag set processing in a DB site in the distributed type of database system according to Embodiment 1 of the present invention.

Description is made specifically for a consistency managing method in the distributed type of database system according to Embodiment 1 with reference to the flow chart. FIG. 5A is a flow chart showing transaction processing in each of the DB sites 102 to 105, and FIG. 5B is a flow chart showing flag set processing in each of the DB sites 102 to 105. FIG. 6A is a flow chart showing the processing for receiving a request message in the broadcasting station site 101, and FIG. 6B is a flow chart showing the processing for consistency management in the broadcasting station site 101. It should be noted that FIG. 5A shows a flow from generation to end of transaction generated in any of the DB sites 102 to 105.

In the distributed type of database system according to Embodiment 1, the broadcasting station site 101 gives permission of updating in the check phase of the optimistic control system. Assuming that there are n-number of copied data for an object O in the system, each of the data is expressed by $O_1, \ldots, O_n$. A time stamp indicating the time when the object O managed by the broadcasting station site 101 as management information is updated last is expressed as $t(O_O)$, and a finally updated time stamp of the object O stored in transaction T generated in any of the DB sites 102 to 105 is expressed as $t(Oi, T)$. Namely, $t(Oi, T)$ expresses "which version of the object the transaction T gets access to".

The transaction T accesses a plurality types of object (copied data) locally existing in general. When the transaction T is the read-only transaction and old data may be read out, processing for the check phase and write phase described below is omitted and processing can be carried out locally in the DB sites 102 to 105. It should be noted that description is made hereinafter for transaction processing mainly with the transaction T for executing the processing for updating generated in the DB site 102.

In FIG. 5A, the DB site 102 initializes an access object list when the transaction T is generated (S501). This access object list is used for describing objects accessed in a read-out phase (S502) described below. Actually, the access object list includes IDs of objects (accessed objects) and dirty flags described later as attributes. It should be noted that the dirty flags are initialized to be OFF in step S501.

Then, the DB site 102 accesses local data, namely copied data Oi, reads out the copied data Oi onto a private area (work area) for the transaction T. and executes the processing in the read-out phase (S502). Namely, the DB site 102 reads out copied data Oi onto the private area, and reads and writes data from and in the copied data. Herein, when the copied data Oi is to be read out onto the private area, the DB site 102 sets a time stamp t(Oi) indicating a time when the copied data is updated last in a finally updated time stamp of the copied data Oi preserved by the transaction T. Namely, t(Oi) is substituted into t(Oi, T); (t(Oi, T)=t(Oi)).

Also the DB site 102 executes the processing of adding the accessed copied data Oi to the access object list at the point of time when the access is made to the copied data Oi in step S502. Namely, in the read-out phase in step S502, the processing of reading out copied data Oi and adding the accessed copied data Oi to the access object list is repeatedly executed.

Furthermore, the DB site 102 executes the processing for flag setting shown in FIG. 5B in parallel to the processing in the step S502. At first, the DB site 102 waits for receiving a commit message 300 broadcasted from the broadcasting station site 100 through the satellite 106 (S521).

When the commit message 300 for transaction generated in other DB site is received, the DB site 102 determines whether the object in the commit message 300 and the object in the access object list overlaps one another or not (S522: Corresponding to a second updated situation determining step in the present invention). Inotherwords, theDBsite102determineswhether at least one of the objects of which permission of updating is tried to be requested in the transaction T generated in the site has already been updated by transaction generated in any of the other DB sites or not. Specifically, it is determined whether even one of the objects satisfying the condition of t(Oi, T)<t(O$_O$) is included in the commit message 300 or not. It should be noted that, t(Oi, T) is a time stamp of the object which the DB site 102 is about to request updating, and t(O$_O$) is a latest time stamp of the object as one of management information managed by the broadcasting station site 101 (Refer to FIG. 3).

Herein, "overlap" between the object in the commit message 300 to transaction generated in other DB site and the object in the access object list means that the object about to be updated in the transaction generated in the DB site 102 has already been updated by the transaction generated in some other DB site. Namely, it means that, even if the request message 200 was transmitted to the broadcasting station site 101 to request permission of updating, a corresponding transaction T should be aborted. Therefore, the DB site 102 aborts the corresponding transaction T before the request message 200 is transmitted to the broadcasting station site 101 (Refer to step S504 described later).

In step S522, when it is determined that the objects do not overlap, the processing returns again to step S521, and the DB site 102 waits for receiving a commit message 300. On the other hand, when it is determined that the objects overlap one another, a dirty flag in the corresponding object in the access object list is turned ON (step 523).

It should be noted that, the DB site 102 updates, in parallel to the processing in FIG. 5A and FIG. 5B, the corresponding copied data in the site using a value after updating in the commit message 300 received in step S521, and also sets the time stamp t(O) in the commit message 300 as a time stamp of the corresponding copied data (corresponding to the first updating step in the present invention). This processing is executed in the other DB sites 103 to 105 also, and hence consistency of copied data existing in the system can be maintained.

Then, the DB site 102 ends the processing of flag setting in FIG. 5B at the point of time when the read-out phase (S502) of the transaction processing in any DB site shown in FIG. 5A is ended (S524).

Returning to FIG. 5A again, when the processing for the read-out phase in step S502 is finished, the DB site 102 enters a check phase ①, and checks dirty flags in the access object list described in FIG. 5B (S503).

As a result of checking the dirty flags in step S503, when at least one of the dirty flags is ON, the processing shifts to step S511 and aborts a corresponding transaction T (S504: corresponding to the third aborting step in the present invention).

As described above, when an object for which permission of updating is requested in the transaction generated in the site has already been updated by transaction generated in any of the other DB sites, the DB site aborts the transaction by its own decision, and therefore, efficiency of the processing in the broadcasting station site 101 as well as in the DB sites 102 to 105 can be enhanced.

On the other hand, when all the dirty flags are OFF in step S504, the processing shifts to step S505. Namely, the DB site 102 enters a check phase ②, and generates a request message 200 in order to request for permission of updating and transmits the message to the broadcasting station site 101 (S505: corresponding to the update permission requesting step in the present invention).

Included in the request message 200 transmitted in step S505 are, as already shown in FIG. 2, a site ID, a transaction ID, a type of operation for each object (read or write), an object ID, a time stamp (0i, T) and a value after updating. It should be noted that when the operation based on the transaction T is READ, there will be no value after updating, and therefore, the value after the updating is excluded.

The DB site 102 transmits the request message 200 shown in FIG. 2 to the broadcasting station site 101 and enters a check phase ③, and waits for a response to the request message 200 from the broadcasting station site 101 (S506).

Next, description is made for the processing in the broadcasting station site 101 with reference to FIG. 6A and FIG. 6B departing from FIG. 5A for a while. As shown in FIG. 6A, when the broadcasting station site 101 receives a request message 200 transmitted from the DB site 102 (S601) it puts the request message 200 into a queue (S602).

Then, the broadcasting station site 101 reads out, as shown in FIG. 6B, the request messages 200 put into the queue in the order of entry thereof (S611), and determines whether updating of a corresponding object should be permitted or not according to the request message 200 as well as according to the management information for the object of which permission of updating has been requested (S612: corresponding to the update permission determining step in the present invention).

Specifically, the broadcasting station site 101 successively reads out request messages 200 from the queue in parallel to the processing in FIG. 6A (S611), and determines whether a time stamp of each object Oi in the request messages 200 satisfies the condition of the expression: $t(Oi, T) \geq t(O_0)$ or not in a critical section. As described above, $t(Oi, T)$ is a time stamp of any object Oi set in the request message 200, and $t(O_0)$ is a latest time stamp of the object Oi in the management information in the broadcasting station site 101.

When it is determined in step S612 that the time stamp satisfies the condition, the broadcasting station site 101 substitutes Clock (time stamp of the current time clock) into $t(O_0)$; ($t(O_0)$=Clock) for each time stamp in the management information for all objects of which permission of updating has been requested and generates the commit message 300 shown in FIG. 3, and distributes the message to the DB sites 102 to 105 by broadcasting (S613: Corresponding to a step of generating information for updating permission/inhibition information and to a broadcasting/distributing step in the present invention).

The commit message 300 includes, as shown in FIG. 3, a site ID of a DB site requesting update, herein of the DB site 102, a transaction ID generated in the DB site 102, a time stamp ($O_0$) set anew in the broadcasting station site 101 and a value after updating. Herein a time stamp t ($O_0$) is decided according to a clock signal distributed by the broadcasting station site 101 by broadcasting to the DB sites 102 to 105. When the broadcasting station site 101 has copied data of the object, the processing for updating a corresponding copied data to a latest value is executed In the step S613.

Although the broadca sting station site 101 executes the processing of noticing updated information by distributing the commit message 300 to the DB sites 102 to 105 by broadcasting, the processing does not require a reply from the DB sites 102 to 105 differently from a two-phase commit system. Namely, even when any of the DB sites 102 to 105 is down, the broadcasting station site 101 can ignore the DB site and continue the processing.

When the DB site that was down has recovered, the DB site can learn a latest updated situation by executing appropriate transaction to the broadcasting station site 101. After the recovery, the DB site can also be programmed to make an inquiry about a latest updated situation of an object to the broadcasting station site 101 or to any of the other DB sites. Furthermore, considering a case where there is any DB site that can not receive the commit message 300, information for a latest value of an object such as an ID of a DB site having a latest value of an object may periodically be distributed from the broadcasting station site 101.

On the other hand, when it is determined in step S612 that the time stamp satisfies the condition, the broadcasting station site 101 generates an abort message 400 shown in FIG. 4, and distributes the message to the DB sites 102 to 105 in the broadcasting mode (S614: Corresponding to a step of generating updating permission/inhibition information and to a broadcast distributing step). The abort message 300 includes, a site ID of a DB site requesting update, herein of the DB site 102 and a transaction ID generated in the DB site 102.

It should be noted that a latest value of an object is not included in the abort message 400 shown in FIG. 4. Therefore, a site ID having a latest value of the object may be included in the abort message 400 so that the DB site 102 can obtain the latest value of a corresponding object after the DB site 102 aborts the transaction T. It is needless to say that the abort message 400 including a latest value of an object may be distributed from the broadcasting station site 101 to the DB sites 102 to 105, and in this case, the DB site 102 can acquire the latest value of the object from the abort message 400. When the broadcasting station site 101 is decided to have the latest value of the object, the DB site 102 can copy the latest value of a required object from the broadcasting station site 101 after aborting the transaction T.

The broadcasting station site 101 returns again to step S611 and repeatedly executes steps shown in FIG. 6B after distribution of the commit message 300 or the abort message 400 in the broadcasting mode.

Returning to FIG. 5A again, description is made for transaction processing in the DB site 102. The DB site 102 waits for a message broadcast from the broadcasting station site 101 in step S506. When the message is received, the DB site 101 determines whether the received message is a commit message 300 or not (S507).

When it is determined in step S507 that the received message is the commit message 300, the DB site 102 determines whether the message is a commit message 300 addressed to itself (DB site 102) or not (S508). It should be noted that the processing in this step S508 is executed only in a case where there is any transaction in a state of the check phase ③ in the site, but this step S508 may be skipped in any cases other than the above case.

When it is determined in step S508 that the message is the commit message 300 addressed to itself, the DB site 102 enters a write phase, updates corresponding copied data using a value after updating of the object maintained by the site, and sets a time stamp $t(O_0)$ included in the commit message 300 as a time stamp of the copied data (S509: corresponding to the first updating step in the present invention).

It should be noted that corresponding copied data is updated also in the other DB sites having received the commit message 300 addressed to the DB site 102 according to the value after updating in the commit message 300, and a time stamp $t(O_0)$ in the commit message 300 is set as a time stamp of the corresponding copied data (corresponding to the first updating step in the present invention).

When it is determined in step S507 that the received message is not a commit message 300 but it is an abort message 400, the DB site 102 determines whether the message is an abort message 400 addressed to itself or not (S510).

When it is determined in step S510 that the message is the abort message 400 addressed to itself, the DB site 102 aborts the corresponding transaction T (S511: corresponding to the first aborting step in the present invention). On the other hand, when the message is not an abort message 400 addressed to itself, the DB site 102 ignores the abort message, returns to step S507, and waits for receiving a message.

When it is determined in step S508 that the received message 300 is not addressed to itself, the DB site 102 determines, similarly to the processing in step S522 in FIG. 5B, whether the object in the received commit message 300 and the accessed object overlap one another or not (S512: corresponding to the first updated situation determining step in the present invention). In other words, the DB site 102 determines whether at least one of the objects for which permission of updating is requested in the transaction T generated in the site has already been updated by transaction generated in any of the other DB sites or not. More specifically, it is determined whether even one of objects satisfying the condition of $t(Oi, T) < t(O_0)$ is included in the received commit message 300 or not.

Then, when it is determined in step S512 that the object in the commit message 300 and the accessed object overlap one another, the DB site 102 writes a value after updating and a time stamp of the value included in the commit message 300 in a DB 102a (S513: corresponding to the first updating step in the present invention), and then, aborts the transaction T (S514: corresponding to the second aborting step in the present invention).

It should be noted that, even when the transaction T is aborted in step S514, the abort message 400 targeted to this transaction T is distributed from the broadcasting station site 101. However, the transaction T does not exist any more because it has been aborted, and therefore, the abort message 400 is ignored by any of the DB sites 102 to 105.

When the transaction T is aborted in step S514, the DB site 102 transmits a report of this fact to the broadcasting station site 101, and the broadcasting station site 101 responds to the report, and when a corresponding request message 200 is stored in the queue, the processing for aborting the request message 200 may be executed.

On the other hand, when it is determined in step S512 that the object in the received commit message 300 and the accessed object do not overlap one another, the DB site 102 returns to step S507 without executing any processing to the transaction generated in the site, and waits for receiving a message. However, the DB site 102 updates corresponding copied data in the site using a value after updating included in the commit message 300 addressed to any of the sites, and sets a time stamp $t(O_0)$ in the commit message 300 as a time stamp of the corresponding copied data (corresponding to the first updating step).

Herein, in order to make clear the processing after the step S507 and on in FIG. 5A, description assumes a case in which requests for updating from two of the DB site 102 and DB site 103 conflict with each other.

FIG. 7 is an explanatory view that shows the processing when there are two conflicting requests for updating for the same object. It is assumed that both the DB sites 102 and 103 update an object with the same OID (Object ID) (S502). The DB sites 102 and 103 enter the check phase ② and transmit request messages 200 to the broadcasting station site 101 (S505). Herein, it is assumed that the request messages 200 from DB site 102 reaches earlier to the broadcasting station site 101.

The broadcasting station site 101 permits updating by the DB site 102 unless there are any other conflicting requests for updating (S612), and distributes the commit message 300 by broadcasting mode (S613). The DB site 102 that is waiting for the permission from the broadcasting station site 101 in the check phase ③, receives the commit message 300 addressed to itself (S507; S508), and enters the write phase (S509).

On the other hand, the DB site 103 that received the commit message 300 addressed to the DB site 102 determines that the object in the commit message 300 and the accessed object for which permission of updating is requested by the site overlapped one another or not (S507, S508 and S512). Namely, the DB site 103 learned the fact that the same data has been updated in any of the other DB sites, which results in abortion of the corresponding transaction before the abort message 400 addressed to the site is distributed (S514).

As described above, with the commit message 300 in response to the request for updating by the DB site 102, the corresponding copied data is updated also in the other DB site 103 to 105. The commit message 300 is distributed to the DB sites 102 to 105 by broadcasting, and therefore, the broadcasting station site 101 can match the data in the entire system only by transmitting a single commit message 300, which allows easiness of consistency management to be enhanced. Also in a case of distribution by broadcasting, different from communications through the communication line 107, the commit message 300 and the abort message 400 can be substantially concurrently be distributed to the DB sites 102 to 105 even when the DB sites 102 to 105 exist extendedly over an extremely large number of sites. Accordingly, aside from a DB site being down, even if the system is an extremely large scale distributed type of database system extending over an extremely number of sites, consistency of copied data in the entire system can rigidly be maintained.

As for a case where old data may be read out in read-only transaction, the transaction can locally be executed in each of the DB sites 102 to 105, which allows processing efficiency to be enhanced. In this case, the possibility of serializing one copy can also be insured.

Furthermore, although data in an old version is possibly continued to be read when the read-only transaction is continued, a commit message to transaction generated in any of the other DB sites can be received in Embodiment 1. Therefore, in practice, a problem such that data in an old version is continued to be read does not occur.

③ Variants of the Processing

As a variant of Embodiment 1 of the present invention, various types of conditions for limiting and restricting differences (corresponding to the conditions for updating in the present invention) may be provided in each of the DB sites 102 to 105, and copied data stored in each of the DB sites 102 to 105 may be updated only when the conditions are satisfied (Refer to "Considerations of Parallel Processing Control System on an Information Broadcasting System", Yukari Shirota, Atushi Iizawa, Report to Information Processing Society, 97-DBS-113-45, 1997).

As the conditions for limiting and restricting differences, the following items a) to e) can be considered.

a) A cycle for refreshing is set and updating is executed once for every refreshing cycle.

In each of the DB sites 102 to 105, database in the site is updated once for every specified cycle. Updating information is set in a queue, and database at the site is updated once for the specified cycle according to the updating information.

b) Processing for updating is executed when a number of updating information in the queue exceeds a specified number.

For instance, in a case where a limit number is set to 3, the processing for updating is executed when 3 pieces of updating information are stored in the queue.

c) A data area as a reference for execution of the processing for updating is previously decided, and when data in the area is updated, the processing for updating is executed.

For instance, when two attributes of title and author in bibliographic information are updated, the processing for updating is immediately executed, and this scheme is effective when updating information is to be publicized immediately. As an attribute of the scheme, an immediate updating flag is attached to each object or to any attribute thereof, and when information with the immediate updating flag turned ON is updated, the processing for updating is immediately updated. However, when setting this condition, it is necessary to set the condition together with other conditions.

d) A threshold value as a reference for execution of the processing for updating is set, and when the present threshold value is exceeded, the processing for updating is updated.

A threshold value is set for a degree of data updating. For instance, an absolute value requiring execution of the processing for updating when 1/20 or more of contents is updated is set, or the condition is set that the processing for updating is immediately executed when time of reference thereto exceeds 100 times. The latter case is based on the concept that the fact that the times of reference thereto exceeds a certain number indicates popularity of the contents and it is better to update the contents immediately.
e) The processing for updating is executed when the version changes greatly.
This scheme is suited, for instance, to a case where the processing for updating is not executed for miner correction such as correction of incorrect characters in the first version of a book or the like but the processing for updating is immediately executed, for instance, when an updated version with the contents substantially modified is addressed.

The above conditions a) to e) for limiting and restricting differences can be set in combination thereof.

(3) Evaluation of a System

Assuming that a distributed type of database system according to Embodiment 1 of the present invention is used for distributing a program for broadcasting, an evaluation is made as to under what type of operating environment the distributed type of database system according to Embodiment 1 can effectively be utilized.

At first description is made for conceivable applications. The application system assumed herein is an information broadcasting system, and also it is assumed that data to be broadcast is a block of information such as a magazine or a CD-ROM (Refer to "Extremely Large Distributed Type of Database System for Information Broadcasting", Atushi Iizawa, Kazushige Asada, Yukari Shirota, Report to the Information Processing Association, 97-DBS-113-44, 1997). Size of this information package is about 100 Mb per package, and the following contents can be considered.

a) Broadcasting program table (EPG):A program table for the current broadcasting with broadcasting schedule for information broadcasting added thereto.

b) Additional information for the current broadcasting program:Detailed information for contents of the current program given to viewers.

c) Selectable information program:Program from which a user can selectively and interruptively obtain desired information such as a program for broadcasting weather intelligence or event information such as those provided in town papers.

d) Index information: Index for locations of information (contents) and broadcasting time.

In case of ordinary TV programs currently being broadcasted the frequency of updating is very small, however, in case of the information package as described above the frequency of updating is not small. It is assumed in description of the evaluation model system that information package like town papers of neigh boring areas is distributed. The contents include information on movies, dramas, event information and a TV program table or the like.

Next, description is made for outline of the system assumed herein. It is assumed herein that there are 200 number of DB sites throughout Japan and that a number of information packages is 100 magazines. The object size (size of data to which OID is allocated) is 5 MB equivalent to 1/20 of one information package (100 MB). In addition, average percentage of updating for each object in one transaction is 10% of each object, namely 0.5 MB. Further, it is assumed herein that on an average 5 objects are read in and 2 objects are written in one transaction.

Moreover, it is assumed that broadcasting is executed via a communication satellite, and that a band width of the broadcasting transfer path is 5 Mbps. A substantially wide bandwidth is required in the ordinary TV broadcasting, but a bandwidth of around 5 Mbps can be considered as appropriate in a case of information broadcasting when a case of Internet service provided through a communication satellite is taken into considerations as a model. It is assumed herein that a bandwidth of a communication path between each of the DB sites 102 to 105 and the broadcasting station site 101 is 1.5 Mbps. In addition, it is assumed that a bandwidth of the communication path within the broadcasting station site 101 is 1 Gbps.

With the distributed type of database system according to Embodiment 1 of the present invention, work load is concentrated on the broadcasting station site 101, so that processing in the broadcasting station site 101 is apt to be bottlenecked. Therefore, modeling is performed herein assuming that there is only one broadcasting station site 101, that requests for updating arrive at random from the DB sites 102 to 105, and that the service time is distributed in the form of index type of M/M/1 queue matrix.

FIG. 8 is an explanatory view showing a sequence of access operations among the DB sites 102 to 105, broadcasting station site 101 and communication satellite 106. The Eq (average total processing time including waiting time) can be expressed by the following equation.

$Eq=Ew+Es$ $Ew=Es \times \rho/(1-\rho)$ $\rho=Es/Ea$

Here Ew indicates an average waiting time for processing at a broadcasting station site, ρ indicates an average use rate in a broadcasting station site, and Ea indicates an average arrival time interval of traffics to and from the broadcasting station site 101.

In the following, a value of the total processing time Eall shown in FIG. 8 is evaluated based on the assumptions as described above. Based on the assumption that there are 100 types of magazines and that there are on average 10 number of DB sites 102 to 105 each requesting updating of information therein for one information package magazine, and also based on the estimation that an average time interval between time points when one DB site issues a request for updating is 15 minutes, then Ea becomes 0.9 sec. When it is assumed that Edb1 is 0.1 sec, Ew2 is 0.1 sec, Edb2 is 0.1 sec and Es is 0.05 sec, Eall is around 7.3 sec.

A relationship between a transaction average arrival rate A, which is an inverse number of Ea (λ1/Ea[1/sec]) and a response time is evaluated. At first, there is the condition of Es/Ea<1 as a restriction for establishment of this M/M/1 system. Therefore, A must be smaller than 20 (A<20). The distributed type of database system according to Embodiment 1 is based on the optimistic parallel processing control system, so that the probability of abortion Pa when commitment is tried first time can be approximated by the following equation (P.S. Yu; "Modeling and Analysis of Concurrency Control Schemes" in Concurrency Control Mechanisms in centralized Database Systems , V. Kumar (ed.), Prentice Hall, pp. 106–147, 1996).

$$Pa = 1 - \exp\left(-\frac{\lambda N_L^2 p_u T_H}{L}\right) \quad (1)$$

There are two types of access modes: read and write, and the probability of data access in the write mode is indicated by $p_u$. λ indicates an arrival rate of request for updating, $N_L$ indicates an average number of data accessed in one transaction. L indicates a number of data in the entire system and $T_H$ indicates a data retention time in one transaction (a period of time from the initial access until end of the transaction). In the first trial, value of Eall is used as a value for $T_H$. When aborted in the first trial, transaction is executed again, and this operation is repeated until commitment is established. It should be noted that λ, Eall and Pa in the i-th trial are expressed herein as $\lambda_i$, $Eall_i$ and $Pa_i$ respectively. In the I-th trial, value of $Eall_i$ is used as a value for $T_H$. Relationship between parameters in terms of approximation are $Eall_i(\lambda_i)$, $Pa_i(\lambda_i, Eall_i)$, $\lambda_{i+1}(Pa_i)$.

The response time R can be obtained by summing up value for i=1, . . ., ∞ [expected value $R_i$ for the i-th trial time×probability of generation of the i-th trial). An advantage provided by the distributed type of database system according to Embodiment 1 is that abortion of transaction can be detected quickly and the average waiting time in the i-th trial when aborted i-th time is $Eall_i/2$. From what was described above, an expected value for the response time R in the entire system can be expressed by the following expression.

$$R = \sum_{i=1}^{\infty} \left\{ \prod_{j=0}^{i-1} Pa_j \times (1 - Pa_i) \times R_i \right\} \quad (2)$$

$$R_i = \sum_{n=0}^{i-1} Eall_n / 2 + Eall_i$$

$$Pa_0 = 1, Eall_0 = 0$$

Figure 9:
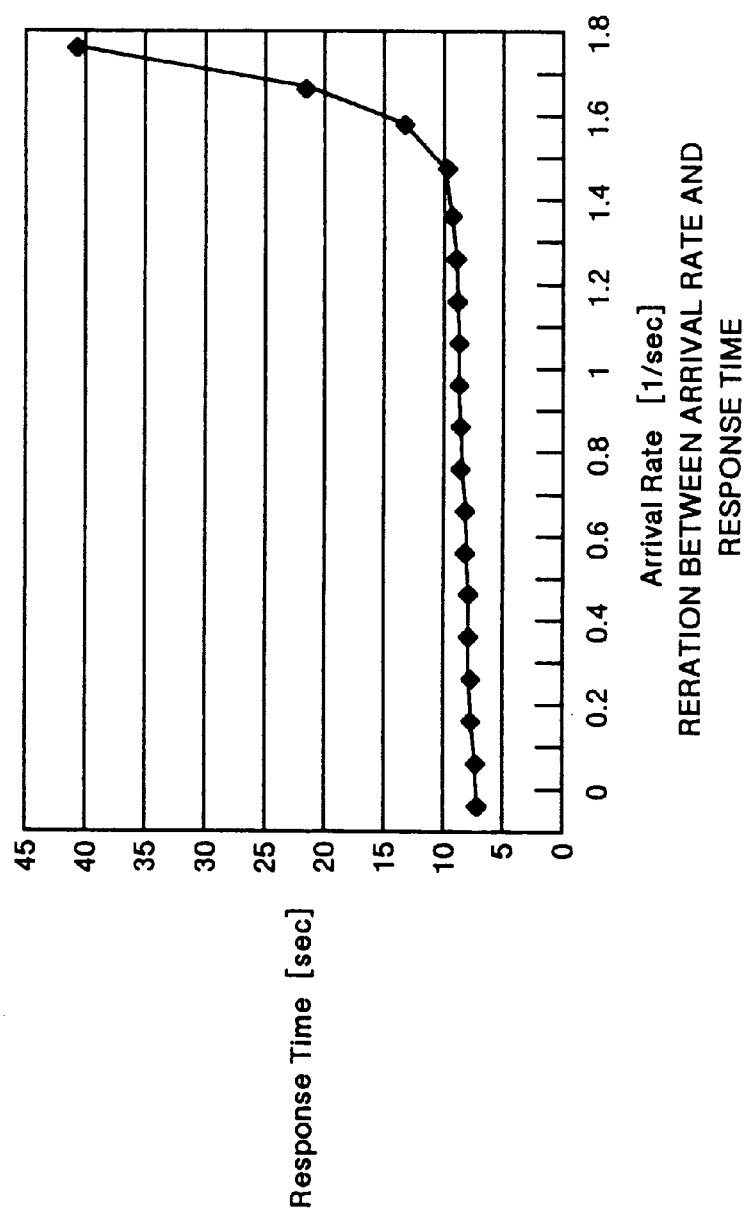
FIG. 9 is a graph showing a relation between an initial value $\lambda_1$ of an arrival rate and a response time R for evaluating the distributed type of database system according to Embodiment 1 of the present invention.

FIG. 9 is a graph showing a relation between the initial value $\lambda_1$ of the arrival rate and the response time R. R rapidly increases at a value of $\lambda_1$ around 1.4. It can be considered from this FIG. 9 that a limit of expansion of this system is indicated by a value of $\lambda_1$ around 1.6. When $\lambda_1$ is equal to 1.6, R is around 14 sec. It is assumed above that contents of one magazine is updated in one site at an interval of 15 minutes, but in this model system, the load may be increased up to a value of $\lambda_1$ equal to 1.6, namely up to a cycle of once for around 10 minutes.

As a factor for bottlenecking a smooth response, the fact that a bandwidth of a communication transfer path for uplinking to the broadcasting station site 101 is small can be pointed out. Of the 7.3 sec for $Eall_1$, around 5.3 sec is the communication time. At present, the telephone line network is regarded as a promising candidate for an alternative path for uplinking, but there are limits in utilization of the public line network, and therefore it is clear that other means will be utilized in the future.

(4) Effects Provided in Embodiment 1

As described above, with the consistency managing method for a distributed type of database system according to Embodiment 1 of the present invention, as the commit message 300 or an abort message 400 is broadcasted from the broadcasting station site 101 to the DB sites 102 to 105, even in an extremely large scale distributed type of database system extending over an extremely large number of database sites, it is possible to realize consistency managing method not causing any conflict between data in the system.

Moreover, in a case where a centralized management system that permits data updating only in the broadcasting station site 101 is employed, each of the DB sites 102 to 105 itself can determine whether transaction is to be aborted or not, so that load on the broadcasting station site 101 can be reduced and also the processing efficiency in each of the DB sites 102 to 105 can be improved.

Furthermore, as the broadcasting station site 101 distributes a clock signal for realization of consistent time clock over the entire system is broadcasted, even in an extremely large scale distributed type of database system extending over an extremely large number of database sites, the system can be put under unified control based on common system clock.

As the distributed type of database system according to Embodiment 1 of the present invention can be easily constructed using facilities for digital television broadcasting, the cost for the entire system can be reduced.

In addition, as a commit message is broadcasted, it is possible to estimate a period of time for commitment of updating. The time for communication between the broadcasting station site 101 and each of the DB sites 102 to 105 can be estimated from congestion in the network (by sending a dummy message from each of the DB sites 102 to 105 to the broadcasting station site 101 and measuring a time required until a response to the dummy message is received).

Next, description is made for a distributed type of database system according to Embodiment 2 of the present invention in the order of,
(1) Problems in satellite broadcasting
(2) System configuration
(3) Consistency management for copied data
(4) Effects in Embodiment 2.
(1) Problems in Satellite Broadcasting As described in Embodiment 1 above, in the distributed type of database system shown in FIG. 1, the commit message 300 or abort message 400 is broadcasted from the broadcasting station site 101 to each of the DB sites 102 to 105 using the satellite 106. However, as a frequency used in the satellite broadcasting is very high, even if error correction code is used or the same data is broadcasted several times, the electric wave attenuates due to climatic conditions such as rain, snowfall, or strong winds, and sometimes the DB sites 102 to 105 may not receive the commit message 300 or abort message 400. When the DB sites 102 to 105 fail to receive the message, if communications is employed, it is possible to request retransmission of the message at a lower level or to retry transmission of the message after time out as countermeasures against conflict between nodes or any trouble. However, such countermeasures can not be employed in a case of broadcasting.

At present a 12 GHz band is used in the satellite broadcasting, but it has been decided that, if required a 21 GHz band may be used in year 2007 and on. However, influence of rain becomes larger when a frequency used for broadcasting is 10 GHz or more. When it rains heavily, amplitude of an electric wave attenuate to ½ to ⅓ of the original amplitude in a case of a 12 Ghz band, to ⅕ to ⅒ in a case of a 20 Ghz band, and to around ⅟₅₀ in a case of a 30 GHz band. Namely, when a frequency is 30 GHz or more, influence cause by absorbance of electric waves by molecules or vapor in the atmosphere is very strong (Shozo Iwasaki (c. e), Shoji Kubo, "Satellite Communication", 1985, Ohm Inc.). To solve the problem described above, line designing is made so that influence by rainfall is minimized, but receiving trouble may occur due to influence by rainfall several times a year (Susumu Nagasaka, Giichi Ono, Shoji Watanabe and Kenji Koyama, "Modern Television, Broadcasting Technology", 1989, Ohm Inc.). It should be noted that, a relation between strength of rainfall and an attenuation rate due to rainfall and countermeasures against the phenomenon are described in detail in Akira Yamada, "For Further Development of Digital Broadcasting", NHK Research Institute R & D, pp. 17–40, No. 46, August, 1997.

As influence of snowfall over electric waves transmitted from a broadcasting satellite such phenomena as propagation loss during snowfall and lowering of a gain of an antenna due to deposition of snow thereon can be pointed out. It seems that attenuation due to snowfall is relatively low such as 1 dB or below, but when snow piles up on an antenna, sometimes it may become impossible to receive electric waves according to a quality of the snow or situation of snow deposition.

In addition, sometimes an antenna trembles due to strong wind and its orientation may be disturbed. When the disturbance is large, a receiving level may become disadvantageously lower (Mikio Houjyo (ed.), "Receiving Technology in New Media for Broadcasting: Satellite Broadcasting/Teletext, Denshi Gijutsu Shuppan, 1984).

As described above, the DB sites 102 to 105 in the distributed type of database system described in Embodiment 1 may fail in receiving the commit message 300 or abort message 400 distributed in the broadcasting mode from the broadcasting station site 101 due to an influence of climatic conditions or the like. Problems which arise when the DB sites 102 to 105 fail in receiving the commit message 300 or abort message 400 are described below.

For instance, when the DB site 102 transmits a request message 200 requesting permission of updating to the broadcasting station site 101, the DB site 102 must wait for a specified period of time until the commit message 300 or abort message 400 is received. However, if the message is not received before passage of the specified period of time, time out occurs and it becomes important to decide what countermeasures should be taken. As one of countermeasures, it is conceivable to abort the transaction as it is. However, when a system in which the latest value for an object is not preserved in the broadcasting station site 101 is constructed, a problem does not arise if the message is the abort message 400, but a problem arises if the message is the commit message 300. Because, if all of the DB sites 103 to 105 other than the DB site 102 fail in receiving the commit message 300, there exists no DB site preserving the latest value for the object allowed to be updated.

In addition, as the commit message 300 is distributed in the broadcasting mode from the broadcasting station site 101, even if each of the DB sites 102 to 105 fails in receiving the commit message 300, the failure in receiving the message can not be detected immediately.

Therefore, in the distributed type of database system according to Embodiment 2, each of the DB sites 102 to 105 can make an inquiry as to the commit message 300 or abort message 400 to the site has been distributed in the broadcasting mode or not. Also in the distributed type of database system according to Embodiment 2, failure in reception can be alerted from outside to the DB site having failed in receiving the commit message 300.

In other words, the distributed type of database system according to Embodiment 2 is applied in the distributed type of database system according to Embodiment 1, and a failure in receiving a message distributed from the broadcasting station site 101 to each of the DB sites 102 to 105 can efficiently be recovered, and the latest value for each object is always preserved in the system, thus the system reliability is improved.

(2) System Configuration

Configuration of the distributed type of database system according to Embodiment 2 is the same as that shown in FIG. 1, therefore description is made herein only for management information which the broadcasting station site 101 manages for each object.

The broadcasting station site 101 has management information for each object existing in a system as described in Embodiment 1, and manages consistency of copied data in the DB sites 102 to 105. It is assumed in description of Embodiment 1 that the broadcasting station site 101 has the management information as described below for each object.

OID (Object ID)

Final updating stamp t ($O_0$) (Latest time stamp for an object)

Finally updated site ID (indicating which site has been finally updated)

Finally updated transaction ID (indicating which transaction has been finally updated)

Latest value storing site ID information (ID of the DB site storing the latest value for an object is registered)

Representative site ID information (ID of a DB site specified as a representative site described later is registered).

Although detailed description is provided later, the latest value storing site ID information is generated, when a DB site receives the commit message 300 addressed to the site or other one, updates particular copied data to the latest value thereof, and reports the fact to the broadcasting station site 101, by registering the site ID. The representative site ID information is generated by registering a site ID of the site having a role of reporting that prespecified copied data has been updated to the latest value to the broadcasting station site 101. Therefore, a site ID of the DB site specified as a representative site is registered as the latest value storing site ID. It is needless to say that, in addition to the types of information described above, the latest value for an object existing in a system may be stored as one of management information.

It is assumed in description of Embodiment 2 that there occurs no error during communication and that errors in receiving broadcasting signals occur several times in a year. As a rainfall or a snowfall continues for a certain period of time, it can be expected that, once a receiving trouble occurs in any of the DB sites 102 to 105, the receiving trouble continues for a certain period of time.

(3) Consistency Management for Copied Data

Next, description is made for the method of managing consistency of copied data in the distributed database system according to Embodiment 2 of the present invention in the order of:

① Processing for specifying a representative site
② Transaction processing in a DB site
③ Processing for receiving and reporting in a DB site
④ Processing A for broadcasting a site storing the latest value therein from a broadcasting station site
⑤ Processing B for broadcasting a site storing the latest value therein from a broadcasting station site
⑥ Functions and roles of a DB site
① Processing for Specifying a Representative Site As specific processing in the method of managing consistency of copied data in the distributed type of database system according to Embodiment 2, at first description is made for the processing for specifying a representative site from among the DB sites 102 to 105 for each object distributed and managed as copied data over the DB sites 102 to 105 In Embodiment 2, this representative site is defined as a site specified at least one from among the DB sites 102 to 105 for each object and having role to always preserve the latest value for each object to insure that the value for an object distributed as copied data over a system always exists in the system. The representative site also has a role for making it possible for other DB sites to copy the latest value for the object stored therein. In the following, detail description is made for operations and roles of the DB site specified as a representative site.

Figure 10:
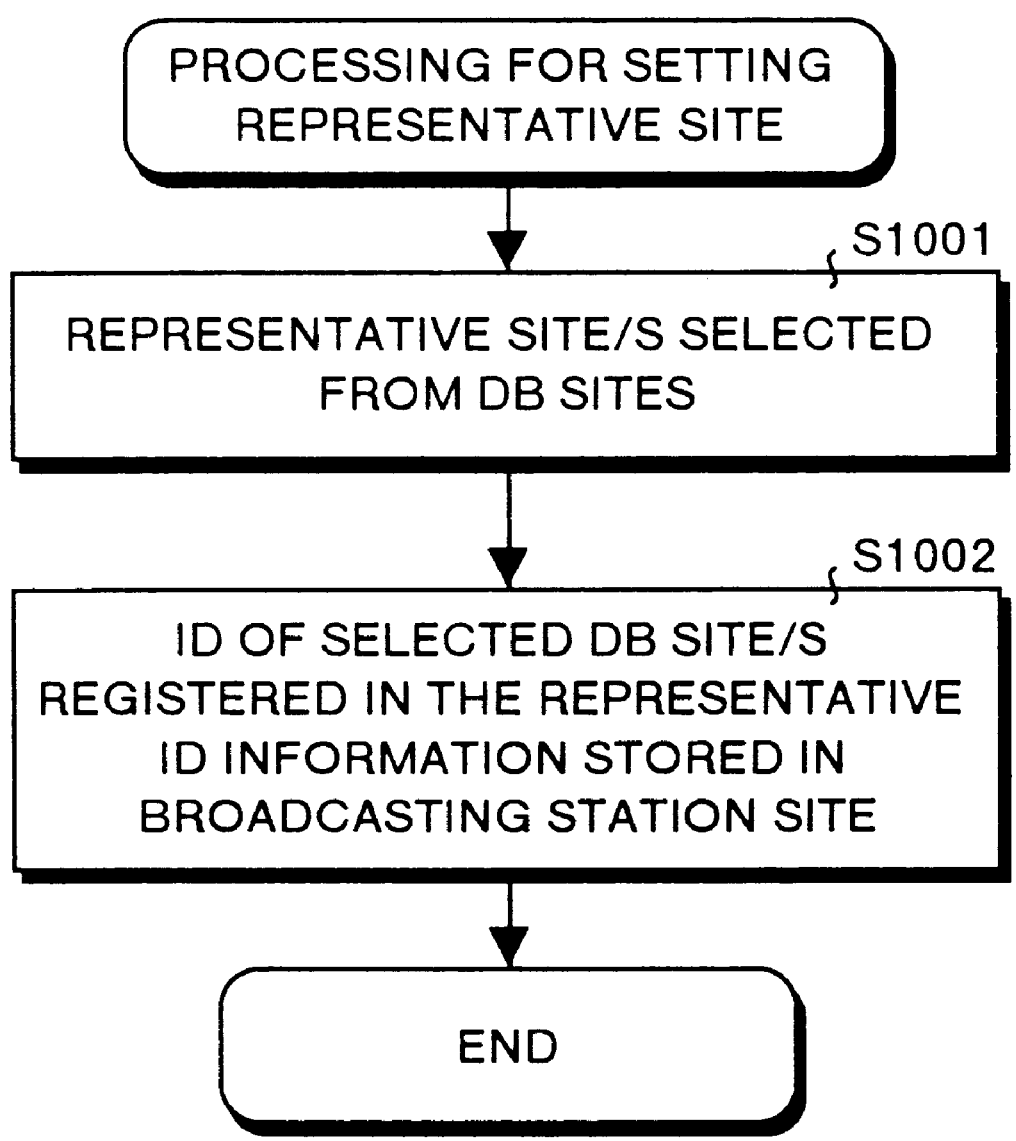
FIG. 10 is a flow chart showing an example of processing for specifying a representative site in the distributed type of database system according to Embodiment 2 of the present invention.

FIG. 10 is a flow chart showing an example of the processing for specifying a representative site. At first, for each object of copied data distributed over a plurality of DB sites in a system, at least one DB site is selected as a representative site from among a plurality of DB sites 102 to 105 (S1001: Corresponding to the representative site specifying step in the present invention). For instance, it is assumed in the following description that the DB sites 103 and 104 are selected as representative sites for an object O, copied data of which are distributed over and stored in the DB sites 102 to 105.

Then site IDs of the DB sites selected as representative sites are registered in the representative site ID information (managed in the broadcasting station site 101) for the object (S1002: Corresponding to the representative site specifying step in the present invention). In this case, site IDs of the DB sites 103 and 104 are registered in the representative ID information for the object O.

It should be noted that the processing for specifying a representative site described with reference to FIG. 10 is executed at a stage when the system is designed, but that it is possible to arbitrarily add or change the representative site/s after start of practical operation of the system.

In the processing shown in FIG. 10, one DB site may be specified as a representative site for all the objects of copied data distributed over a plurality of DB sites in a system, but in that case it is necessary to take into account cost for management of copied data at the DB site.

② Transaction Processing in a DB Site

Next, description is made for the processing for updating a transaction at a DB site as well as for processing executed when a DB site requesting updating fails in receiving a message addressed to the DB site in the distributed type of database system according to Embodiment 2. It should be noted that description is omitted or described only briefly for the same portions in the transaction processing at each DB site as those described in Embodiment 1.

Figure 11:
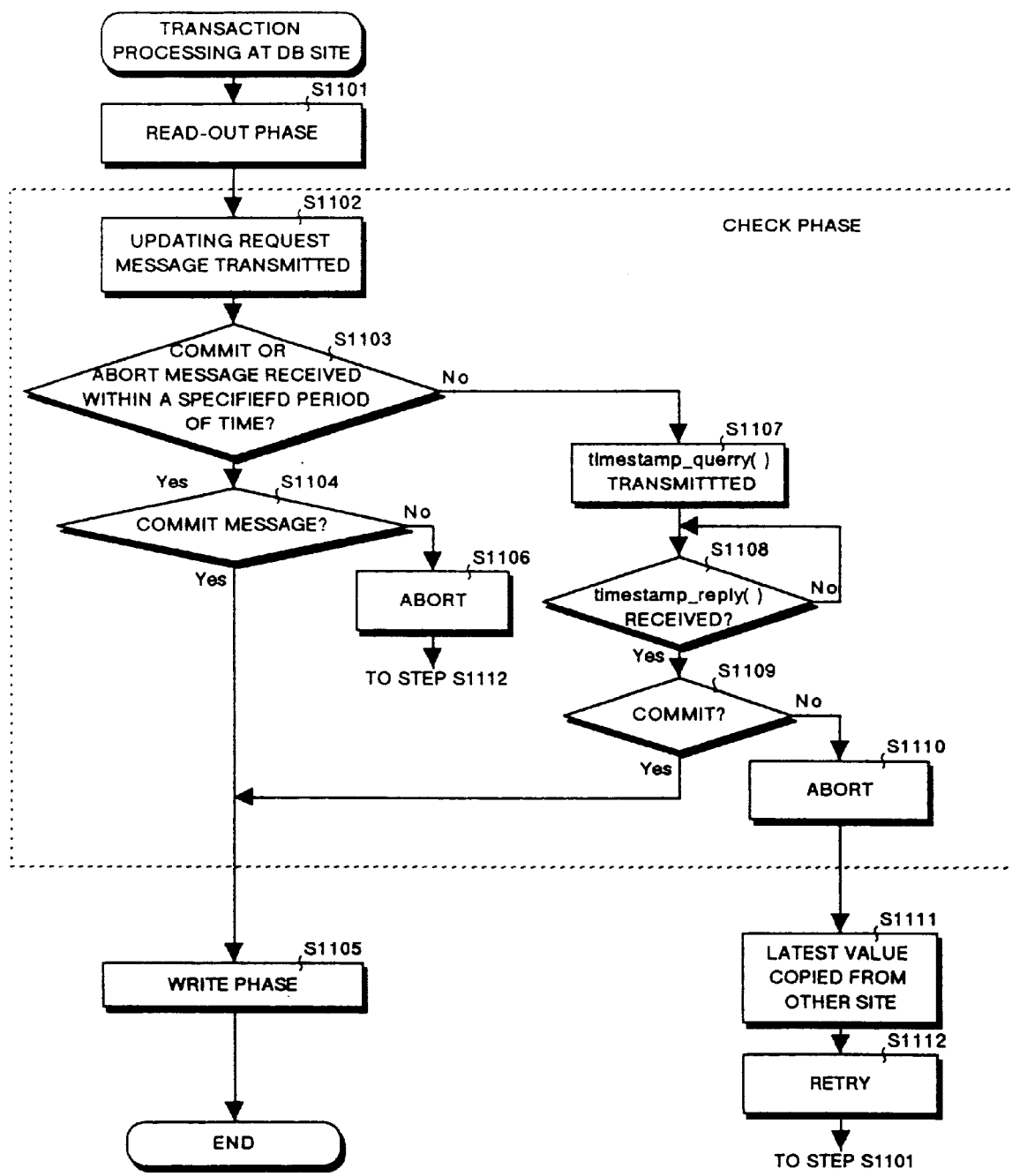
FIG. 11 is a flow chart showing processing for transaction in a DB site in the distributed type of database system according to Embodiment 2 of the present invention.

FIG. 11 is a flow chart showing the transaction processing at a DB site. Herein it is assumed that a transaction for updating the object O is generated at the DB site 102. In the example described above, although the DB site 102 is not specified as a representative site for the object O, the processing shown in FIG. 11 does not vary according to whether the DB site 102 is specified as a representative site for the object O or not.

When a transaction T for updating the object O is generated, the DB site 102 immediately accesses local data, namely copied data Oi, read out the copied data Oi into a private area (work area) of the transaction T, and executes processing in the read-out phase (S1101). Namely, the DB site 102 reads out the copied data Oi into a private area, and executes read and write operations. When reading out the copied data Oi into the private area, the DB site 102 sets a time stamp t(Oi) indicating a point of time when the copied data Oi is updated last as a finally updated time stamp for the copied data Oi stored in the transaction T. Namely the substitution of t(Oi, T)=t(Oi) is executed.

The DB site 102 enters the check phase when the processing in the read-out phase in step S1101 is finished, and transmits a request message 200 to the broadcasting station site 101 (S1102: Corresponding to the updating permission requesting step in the present invention). The request message 200 transmitted in this step includes a site ID, a transaction ID, an operation for each object (read or write), a target object ID, a time stamp $t(Oi, T)$ and an updated value as shown in FIG. 2.

As the processing executed in the broadcasting station site 101 when the request message 200 transmitted from the BD site 102 is received is the same as that shown in FIG. 6A and FIG. 6B, description thereof is omitted herein. When acknowledging the request for updating according to the request message 200, the broadcasting station site 101 updates the final updating time stamp t(O), a finally updated site ID, a finally updated transaction ID included in management information for the corresponding object, and further clears the latest value storing site ID information. The processing for clearing the latest value storing site ID information is described later.

The DB site 102 transmits the request message 200 shown in FIG. 2 to the broadcasting station site 101, waits for a response to the transmitted request message 200 from the broadcasting station site 101, and then determines whether the commit message 300 or abort message 400 is received from the broadcasting station site 101 within a specified period of time or not (S1103).

When it is determined in step S1103 that some message has been received, the DB site 102 determines whether the received message is the commit message 300 or not (S1104).

When it is determined in step S1104 that the received message is the commit message 300, the DB site 102 enters the write phase, updates the corresponding copied data using a value after updating stored in the site, and sets the time stamp $t(O_0)$ included in the commit message 300 as a time stamp for the corresponding copied data (S1105: Corresponding to the first updating step in this invention). Detailed description thereof is made later, and when the DB site 102 is set as a. representative site for the object 0, a message of reporting completion of receiving and updating is transmitted to the broadcasting station site 101. On the other hand, when it is determined in step S1104 that the received message is not the commit message 300 but that it is the abort message 400, the DB site 102 aborts the transaction T (S1106: Corresponding to the first abort step in the present invention).

Figure 12:
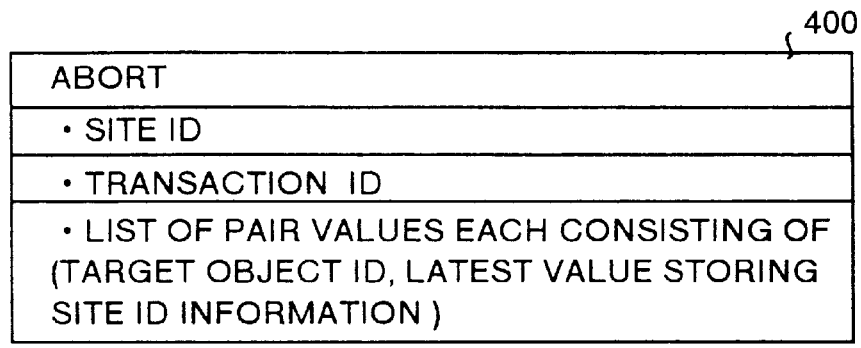
FIG. 12 is an explanatory view that shows an abort message broadcasted by a broadcasting station site to each DB site in the distributed type of database system according to Embodiment 2 of the present invention.

FIG. 12 is an explanatory view showing an abort message 400 distributed from the broadcasting station site 101 to each of the DB sites 102 to 105. The abort message 400 used in Embodiment 2 is different from the abort message 400 shown in FIG. 4, and includes therein, in addition to a site ID and a transaction ID, a list of pair values each consisting of a target object ID and a latest value storing site ID information for each object requested permission of updating thereof.

The latest value storing site ID information in the abort message 400 shown in FIG. 12 includes, as described later, a site ID for a DB site storing therein the latest value for the object requested to be updated. For this reason, when aborting the corresponding transaction in step S1106, the DB site 102 stores the latest value storing site ID information and then shifts to step S1111, selects a DB site requiring the minimum access cost according to the latest value storing site ID information, and copies the latest value for the corresponding object from the selected BD site (Corresponding to the third copying step in the present invention). It should be noted herein that the same processing as that described above is executed also in a case where a transaction is aborted in steps S511 and S514 shown in FIG. 5A described in Embodiment 1.

When a transaction is aborted, the latest value for the corresponding object is copied from other DB site in order to improve the processing efficiency in the entire system by reducing a load no the broadcasting station site 101. Also in place of the processing described above, the latest value for an object may be stored in the broadcasting station site 101, and the latest value for the object may be copied from the broadcasting station site 101, or the broadcasting station site 101 may distributed the latest value for the objected included in the abort message 400.

After the latest value for the corresponding object is copied from other BD site in step S1111, the BD site 102 executes the retry processing (S1112).

In the following, description is made for processing executed when the DB site 102 fails in receiving a message addressed to the site in step S1103. When it is determined in step S1103 that neither the commit message 300 nor the abort message 400 has been received (time out), the DB site 102 transmits a final updating time stamp query message for inquiring the latest time stamp for an object requested to be updated to the broadcasting station site 101 at an arbitrary timing (S1107: Corresponding to the updating situation inquiring step in the present invention).

A format of the finally updated time stamp query message transmitted in step S1107 is, for instance, as described below.

timestamp_query (OID)

The DB site generates a finally updated time stamp query message including an ID (OID) for the object requested to be updated, and transmits the generated message to the broadcasting station site 101.

Figure 13:
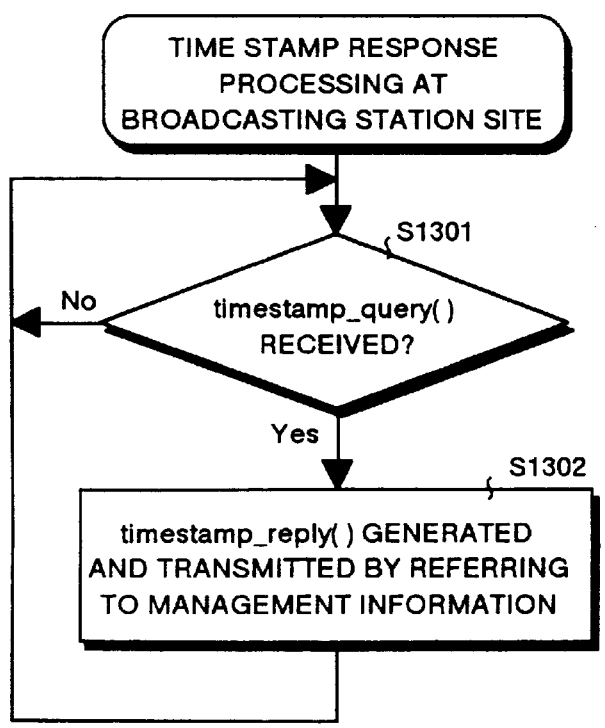
FIG. 13 is a flow chart showing time stamp response processing in the broadcasting station site in the distributed type of database system according to Embodiment 2 of the present invention.

FIG. 13 is a flow chart showing the processing executed in the broadcasting station site 101 in response to the finally updated time stamp query message (processing for returning a time stamp in a broadcasting station site). The broadcasting station site 101 determines whether a finally updated time stamp query message has been received or not (S1301). When it is determined that a finally updated time stamp query message has been received, the broadcasting station site 101 refers to management information for the inquired object, generates a finally updated time stamp response message as a response to the inquiry, and transmits the finally updated time stamp response message via the communication line 107 to the DB site 102 (S1302: Corresponding to the updating situation transmitting step in the present invention).

A format of the finally updated time stamp response message transmitted from the broadcasting station site 101 is, for instance, as shown below.

timestamp_reply (OID, finally updated time stamp t (O$_O$), a finally updated site ID, a finally updated transaction ID, latest value storing site ID information).

Returning again to FIG. 11, the DB site 102 waits for reception of a finally updated time stamp response message in step S1108. When a finally updated timestamp response message is received in step S1108, the DB site 102 determines whether a transaction T generated in the site is to be committed or not (updating of the object O is permitted or not) according to contents of the received finally updated time stamp response message (S1109: Corresponding to the updating situation determining step in the present invention).

In the following, description is made for a reference of determination made by the DB site 102 as to whether the transaction T generated at the site is to be committed or not according to contents of the received finally updated time stamp response message. Herein it is assumed that Oi indicates each object required to be updated in the transaction T, t(Oi, T) indicates a time stamp set in each object Oi, and t(O$_O$) indicates a time stamp for each object Oi put under management by the broadcasting station site 101 shown in the finally updated time stamp response message.

For each object Oi, the DB site 102 determines:
a) whether the finally updated transaction ID shown in the finally updated time stamp response message is equal to a transaction ID of the transaction T or not;
b) whether the finally updated site ID shown in the finally updated time stamp is equal to a site ID of the site or not; and
c) whether t(Oi, T)<t(O$_O$) or not by referring to contents of the received finally updated time stamp response message.

When it is determined as a result of the determination above that there is an evidence indicating that at least one of the objects requested to be updated in the transaction T has been permitted, the DB site 102 commits the transaction T.

When it is determined in S1109 that the transaction is to be committed, the DB site 102 shifts to step S1105, updates the corresponding data using an updated value stored in the site, and sets a the time stamp t(O) shown in the finally updated time stamp response message as a time stamp for the corresponding copied data (Corresponding to the second updating step in the present invention). Although detailed description thereof is provided later, when the DB site 102 is set as a representative site for the object O, the received message indicating completion of updating is returned to the broadcasting station site 101.

On the other hand, when it is determined in step S1109 that the transaction T is not to be committed, namely the transaction T is to be aborted, the DB site 102 stores latest value storing site ID information shown in the finally updated time stamp response message, and then aborts the transaction T (S1110: Corresponding to the fourth aborting step in the present invention).

Then the DB site 102 selects a DB site requiring the minimum access cost according to the latest value storing site ID information stored therein, and executes the processing for copying the latest value for the corresponding object from a selected DB site (S1111: Corresponding to the fourth copying step in the present invention).

In step S1106, the DB site copies the latest value for the corresponding object from other DB site, and then executes the processing for retry (S1112).

As described above, even when the DB site 102 having requested permission of updating for an object fails in receiving a message addressed to the site, the DB site can determine whether a transaction generated in the site is to be committed or to be aborted by executing the processing described above.

Sometimes processing for updating may be executed for the same object by other BD site before a finally updated time stamp query message is transmitted. In this case, sometimes an evidence indicating that updating was executed in a transaction T generated in a site may not exist in the finally updated time stamp response message transmitted to the site from the broadcasting station site 101 even if the message failed in receiving is the commit message 300 (Note that, as a frequency of failing in receiving data in the broadcasting mode itself is only several times in a year and the probability of occurrence of the phenomenon as described above is extremely low).

Figure 14:
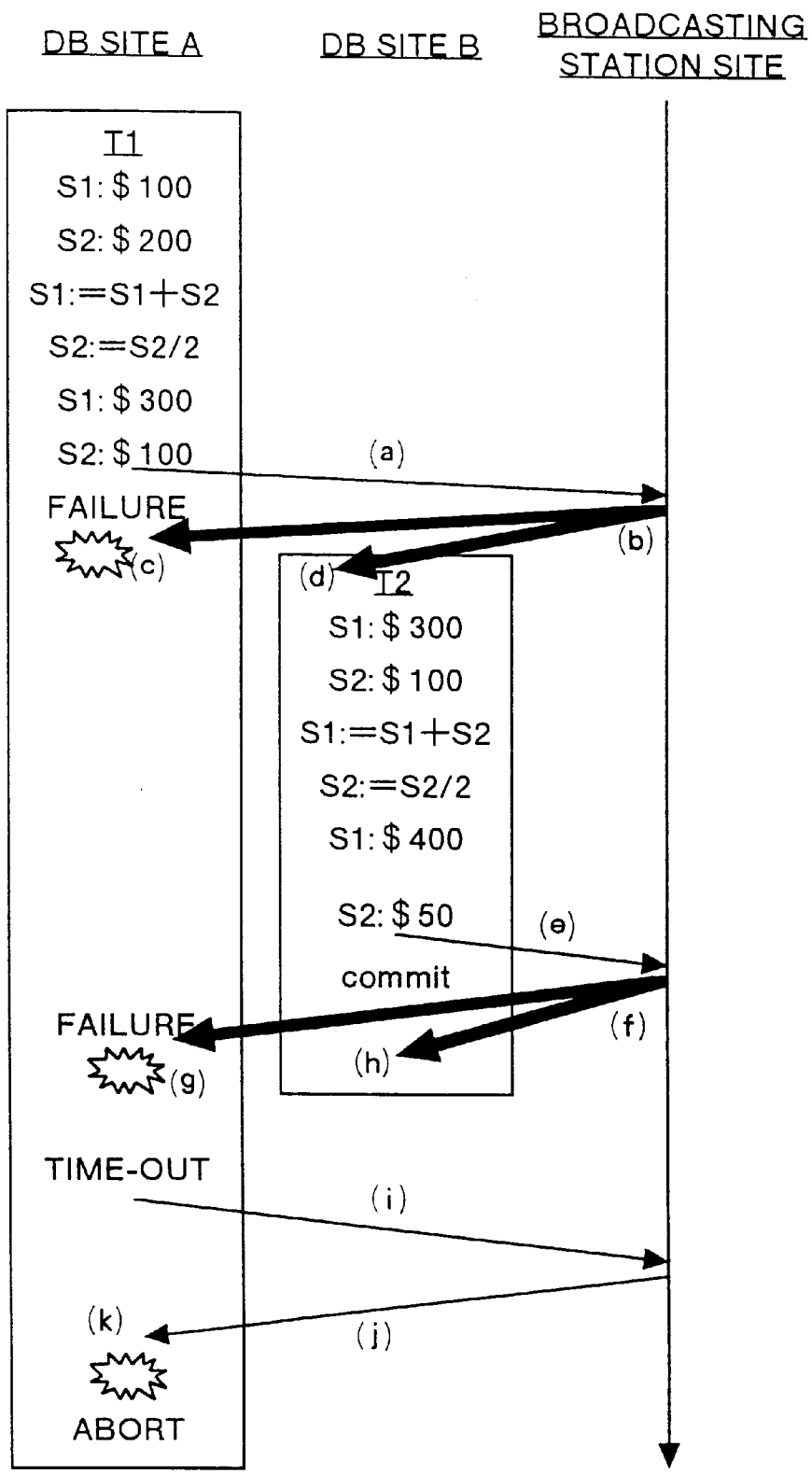
FIG. 14 is an explanatory view for illustrating a case where, after a commit message is not successfully received, processing for updating for the same object is executed in other DB site before a final updating time stamp query message is transmitted in the distributed type of database system according to Embodiment 2 of the present invention.

FIG. 14 is an explanatory view illustrating a case where the processing for updating is executed for the same object by other site after a site fails in receiving the commit message 300 and until the site transmits a finally updated time stamp query message. FIG. 14. shows that the following operations were executed in the order of a) to k) between the DB sites A, B and a broadcasting station site.

a) A transaction T1 for updating a particular object is generated in the DB site A, and a request message 200 is transmitted to the broadcasting station site.
b) The commit message 300 for the transaction T1 is distributed from the broadcasting station site.
c) The DB site A fails in receiving the commit message 300 addressed to the site.
d) The DB site B receives the commit message 300 addressed to the DB site A and updates the corresponding copied data stored in the site.
e) A transaction T2 for updating the same object as that in a) is generated at the DB site B, and a request message 200 is transmitted to the broadcasting station site.
f) The broadcasting station site distributes the commit message 300 for the transaction T2.
g) The DB site A fails in receiving the commit message 300 addressed to the DB site B.
h) The DB site B receives the commit message 300 addressed to the site, and updates the corresponding copied data stored in the site (Transaction T2 committed)
i) The DB site A transmits a finally updating time stamp query message for the object requested to be updated in the transaction T1 to the broadcasting station site.
j) The broadcasting station site transmits the finally updated time stamp response message to the DB site A.
k) The DB site A aborts the transaction T1 according to the finally updated time stamp response message.

Namely, if the processing for updating the same object is executed in the DB site B after the DB site A fails in receiving the commit message 300 addressed to the site and before a finally updated time stamp query message is transmitted, the DB site A aborts the transaction T1 generated in the site. However, the commit message 300 for the transaction T1 has been received in the DB site B, and copied data stored in the DB site B reflect a value of the object requested to be updated in the transaction T1. Therefore, a problem does not arise even if the transaction T1 is aborted.

If the latest value for a corresponding object is copied from other DB site after a transaction T is aborted (step S1111), sometimes the local consistency may be lost. For instance, there occurs a case where, when the latest value for an object is being copied from a DB site, the processing for updating for the same object is executed in any other DB site and the latest value being copied becomes the most updated ones. In addition, in the distributed type of database system according to Embodiment 2, local execution of a read-only transaction is allowed without being required to undergo checking for consistency. Therefore, it does not matter even if copied data becomes an old data (not updated data) while copying in step S1111. If it is required to read copied data updated to the latest value even in a read-only transaction, checking with a time stamp may be executed in the broadcasting station site 101 like in a transaction for updating.

In the above description, when any of the DB sites 102 to 105 fails in receiving the commit message 300 or abort message 400 addressed to the site, a finally updated time stamp query message is used. However, the finally updated timestamp query message may be used not only when any of the DB sites 102 to 105 fails in receiving the commit message 300 or abort message 400, but also when it is required to know the latest value for an object.

To prevent a work load from being concentrated to the broadcasting station site 101, it is desirable that each of the DB sites 102 to 105 accumulates the latest value storing site ID information for objects which the site may access and copies the latest value for a required object from any of the DB sites indicated in the latest value storing site ID information (The latest value storing site ID information is distributed not only in the abort message 400 shown in FIG. 12, but from the broadcasting station site 101 in the broadcasting mode as described later). In addition, it is desirable to construct layered structure among DB sites to prepare for a case where the latest value for an object can not be obedient even by executing the processing described above. In that case, a DB site transmits a finally updated time stamp query message not to the broadcasting station site 101, but to a DB site at a master node, fetches latest value storing site ID information for the object from the DB site at the master node, and copies the latest value for the object from any of the DB sites indicated in the fetched latest value storing site ID information.

Furthermore, when a DB site fails in receiving a message addressed to the site, transactions between the DB site and the broadcasting station site 101 is executed through the communication line 107. The communication line 107 is used because the communication line 107 is more reliable as a complementary mechanism for a case when a DB site fails in receiving a message transmitted in the broadcasting mode (Also it is conceivable that the state where the DB site cannot receive a message continues).

③ Processing for Receiving and Reporting in a DB Site

In the following, description is made for the processing for receiving and reporting to ensure that the latest value for an object is always preserved in a system. This processing is executed by any of the DB sites 102 to 105 specified as a representative site for a particular object. The description assumes that the DB sites 103 and 104 have been specified as representative sites for the object O. and that a transaction for updating this object O has been generated at the DB site 102.

Figure 15:
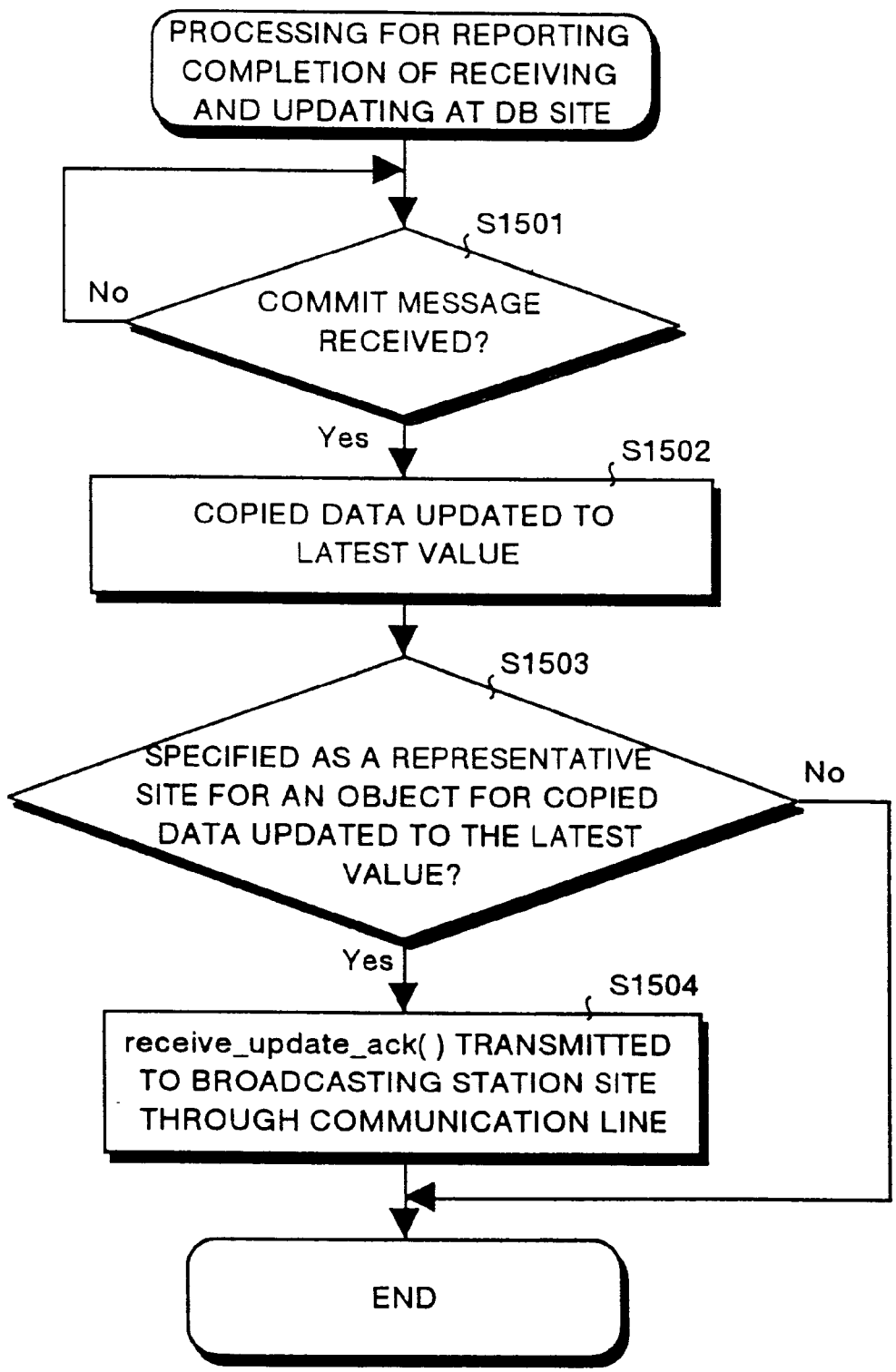
FIG. 15 is a flow chart showing processing for reporting successful reception and updating in a DB site in the distributed type of database system according to Embodiment 2 of the present invention.

FIG. 15 is a flow chart showing the processing for reporting completion of receiving and updating at a DB site. FIG. 15 shows a case where a commit message to a transaction generated at the other DB site is received, but description is made also for the processing at the DB site 102 (As for a case where a commit message for a transaction generated in the DB site itself, refer to FIG. 11).

When the broadcasting station site 101 permits updating of the object O requested for updating from the BD site 102, the broadcasting station site 101 distributes the commit message 300 in the broadcasting mode to each of the DB sites 102 to 105. Each of the DB sites 102 to 105 determines whether the commit message 300 distributed from the broadcasting station site 101 has been received or not (S1501). It is assumed in the following description that the DB site 104 fails in receiving the commit message 300.

The DB sites 103 and 105 which have determined in step S1501 that the commit message 300 has been received update copied data stored in the sites using the latest value for the object O stored in the commit message 300, and also set the time stamp $t(O_0)$ in the commit message 300 as a time message for the corresponding copied data (S1502: Corresponding to the first updating step in the present invention). Similarly, also the DB site 102 which have requested a permission for updating updates the corresponding copied data using a value after updating stored in the site because the transaction generated in the site has committed (Refer to step S1104 and step S1109 in FIG. 11), and further set the time stamp $t(O_0)$ included in the commit message 300 as a time stamp for the corresponding copied data (Write phase: Refer to step S1105 in FIG. 11).

On the other hand, the DB site 104 fails in receiving the commit message 300, but the DB site 104 does not demand permission of updating, and therefore, the DB site 104 does not know that the commit message 300 has been distributed from the broadcasting station site 101, nor that the DB site 104 has failed in receiving the commit message 300.

It should be noted that, in a case where all of the DB sites 102 to 105 do not always have copied data for all types of object existing in a system (namely all of the DB sites 102 to 105 have a portion thereof respectively), the processing for determining whether the received message is the commit message 300 for permitting updating of an object for copied data stored in each respective site may be executed before entering the step S1502.

Next the DB sites 102, 103 and 105 determines whether the DB sites have been specified as representative site for the object O for the copied data updated to the latest value or not (S1503).

When it is determined in step S1503 that the DB sites 102, 103 and 105 have not been specified as representative sites, the DB sites 102, 103 and 105 terminate the processing immediately. On the other hand, when it is determined in step S1503 that the DB sites 102, 103 and 105 have been specified as representative sites, the DB sites 102, 103 and 105 transmit a message for reporting completion of receiving and updating via the communication line 107 to the broadcasting station site 101 (S1504: Corresponding to the information transmitting step in the present invention). In this step, regardless of whether a DB site is the DB site having requested for permission of updating (DB site 102) or a DB site (DB sites 103, 105) only having received the commit message 300, a DB site having updated copied stored in the site data for the object to the latest value thereof transmits the message for reporting completion of receiving and updating to the broadcasting station site 101. In this example, as the DB site 103 has been specified as a representative site for the object O, the BD site 103 transmits the message for reporting completion of receiving and updating to the broadcasting station site 101.

A format of the message for reporting completion of updating and updating is, for instance, as follows. receive_update_ack (a site ID of a site, a list of pair values each consisting of an target object ID and a time stamp $t(O_0)$).

The above description assumes a case where only a DB site specified as a representative site transmits a message for reporting completion of receiving and updating to the broadcasting station site 101, however, the configuration is allowable in which a DB site having requested permission of updating transmits the message for reporting completion of receiving and updating to the broadcasting station site 101 even if the DB site has not been specified as a representative site.

Figure 16A:
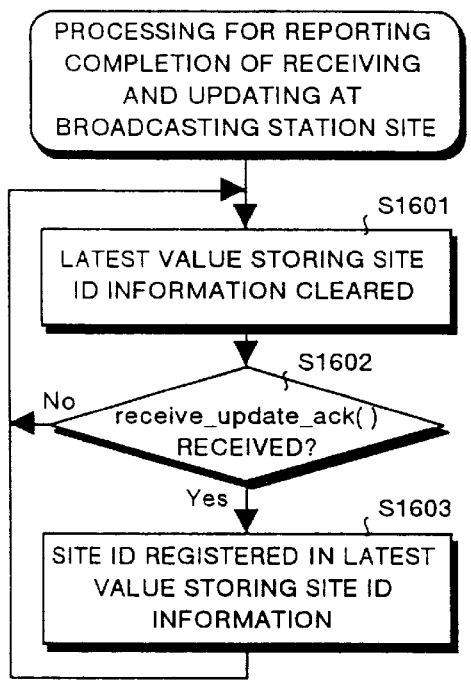
FIG. 16A is a flow chart showing the processing for reporting successful reception and updating in the broadcasting station site in the distributed type of database system according to Embodiment 2 of the present invention.
Figure 16B:
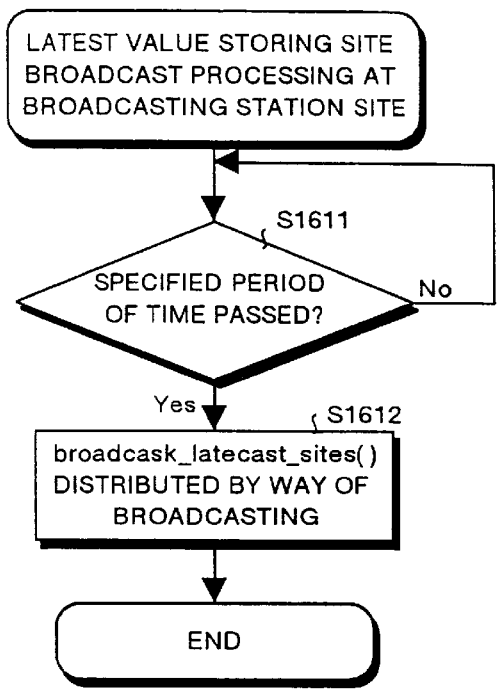
FIG. 16B is a flow chart showing the processing A for broadcasting a site storing therein the latest value in the broadcasting station site in the distributed type of database system according to Embodiment 2 of the present invention.

④A Processing a for Broadcasting a Site Storing the Latest Value therein from a Broadcasting Station Site FIG. 16A is a flow chart showing the processing for receiving a message for reporting completion of receiving and updating in the broadcasting station site 101, while FIG. 16B is a flow chart showing the processing A for broadcasting latest value storing sites executed in the broadcasting station site 101. At first, description is made for the processing for receiving the message for reporting completion of reporting and updating shown in FIG. 16A. The broadcasting station site 101 clears site ID registered in the latest value storing site ID information for sites storing therein the latest value for the object O requested for updating at a point of time when it determines that the request for updating the object O is to be permitted according to a request message 200 from, for instance, the DB site 102 (S1601).

The broadcasting station site 101 distributes the commit message 300 allowing updating of the object O in the broadcasting mode to each of the DB sites 102 to 105, and then determines whether the message for reporting completion of receiving and updating has been received from representative sites for the object O or not (S1602).

When it is determined in step S1602 that the message for reporting completion of receiving and updating has been received, the broadcasting station site 101 registers the site ID or Id in the message for reporting completion of receiving and updating in the corresponding latest value storing site ID information for the object O (S1603: Corresponding to the site information registering/managing step in the present invention). For instance, when the broadcasting station site 101 receives a message for reporting completion of receiving and updating for the object O from the DB site 103, a site ID of the DB site 103 is registered in the latest value storing site ID information for the object O. As described above, for an object, a site ID of at least one DB site is registered in the latest value storing site ID information, which insures that the latest value for the object always exists in the system.

It should be noted that the broadcasting station site 101 distributes the commit message 300 for allowing updating of an object and then preserves the latest value for the object until the message for reporting completion of receiving and updating is received from at least one representative site for the object. In other words, when the broadcasting station site 101 receives the message for reporting completion of receiving and updating from at least one representative site, the broadcasting station site 101 aborts the latest value for the object stored therein (Corresponding to the updated information managing step in the present invention). When the broadcasting station site 101 receives the message for reporting completion of receiving and updating from at least one representative site, the latest value for an object is always preserved in the system without fail, so that there occurs no problem even if the latest value for the object is aborted in the broadcasting station site 101.

The broadcasting station site 101 repeatedly executes the operations in step S1602 and step S1603, and registers the site ID in the message for reporting completion of receiving and updated received thereby as the latest value storing site ID. This processing is repeatedly executed even if it is determined in the step S1611 shown in FIG. 16B that a certain period of time has passed from transmission of the commit message 300 for allowing updating of an object.

Hereafter description is made for the processing for broadcasting latest value storing sites executed in the broadcasting station site 101 shown in FIG. 16B. The broadcasting station site 101 executes the processing shown in FIG. 16A and determines as to whether a prespecified period of time has passed or not after the commit message 300 is distributed (S1611).

When it is determined in step S1611 that the prespecified period of time has passed, the broadcasting station site 101 generates a message for broadcasting latest value storing sites including the latest value storing site ID information with site ID registered therein in step S1603 in FIG. 16A, and then distributes the message in the broadcasting mode to the DB sites 102 to 105 (S1612: Corresponding to the site information distributing step in the present invention).

It should be noted that, when it is found in step S1612 that no site ID has been registered in the latest value storing site ID information, the broadcasting station site 101 may distribute the commit message 300 having the same contents again in the broadcasting mode. For, any of the DB sites 102 to 105 has failed in receiving the commit message 300.

A format of the latest value storing site broadcasting message distributed in the broadcasting mode from the broadcasting station site is, for instance, as shown below.

broadcast_latest_sites (list of triplets each consisting of a target object ID, a time stamp $t(O_0)$, latest value storing site ID information).

When each of the DB sites 102 to 105 receives a finally updated value storing site broadcasting message from the broadcasting station site 101, the DB site stores the latest value storing site ID information In the received latest value storing site broadcasting message in correlation to the corresponding copied data stored in the site. Then each of the DB sites 102 to 105 selects a DB site requiring a minimum access cost according to the latest value storing site ID information stored according to the necessity, and can execute the processing for copying the latest value for the corresponding object form the selected DB site (Corresponding to the first copying step in the present invention).

The DB site 104 assumed as a DB site failing in receiving the commit message 300 in step S1501 in FIG. 15 can detect failure in receiving the commit message 300 by receiving the latest value storing site broadcasting message. As a result, the DB site 104 can store the latest value for the object O by copying the latest value for the object O from other DB site according to the received finally updated value storing site broadcasting message. As the DB site 104 has been specified as a representative site for the object O, when the DB site 104 copies the latest value for the object O from the other DB site, the DB site 104 transmits a message for reporting completion of receiving and updating to the broadcasting station site 101. On the other hand, if the DB site 104 has not been specified as a representative site for the object O, even if the DB site 104 copies the latest value for the object O, the DB site 104 is not required to transmit the message for reporting completion of receiving and updating to the broadcasting station site 101.

⑤ Processing B for Broadcasting a Site Storing the Latest Value therein from a Broadcasting Station Site Furthermore, in spite of the fact that the broadcasting station site 101 has been specified as a representative site for an object, the broadcasting station site 101 can execute the processing for transmitting a latest value storing site broadcasting message via the communication line 107 to a DB site not having transmitting a message for reporting completion of receiving and updating for the object (this processing is defined the latest value storing site broadcasting processing B). The message is transmitted not in the broadcasting mode, but through the communication line 107, because a DB site having been specified as a representative site for an object is still incapable of receiving the message transmitted in the broadcasting mode.

This latest value storing site broadcasting processing B may be executed concurrently with the latest value storing site broadcasting processing A, or may be executed after the latest value storing site broadcasting processing A is executed.

Figure 17:
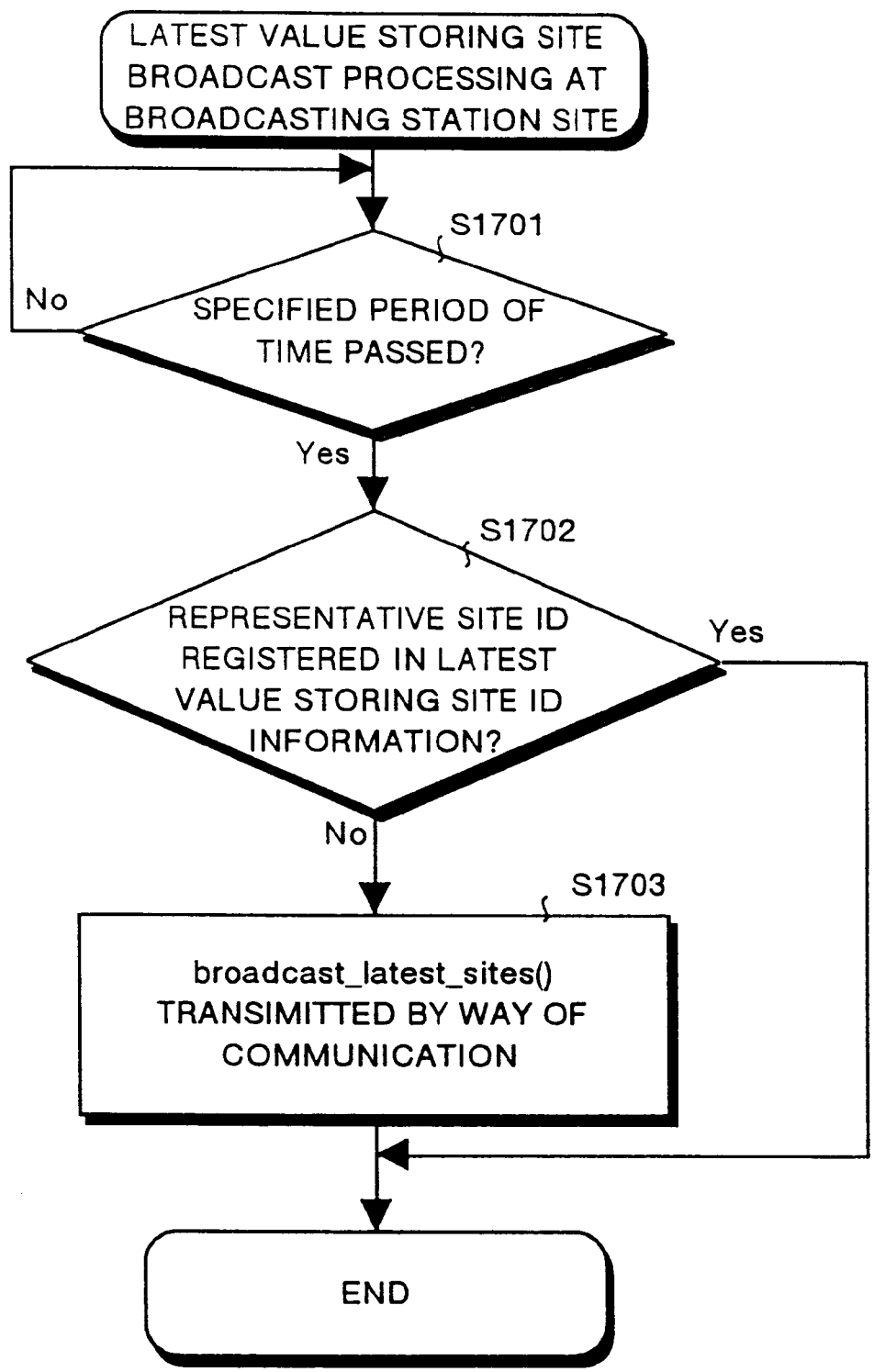
FIG. 17 is a flow chart showing the processing B for broadcasting a site storing therein the latest value in the broadcasting station site in the distributed type of database system according to Embodiment 2 of the present invention.

FIG. 17 is a flow chart showing the least value storing site broadcasting processing B executed in the broadcasting station site 101. The broadcasting station site 101 at first determines whether a preset period of time has passed or not (S1701). When the latest value storing site broadcasting processing B is executed concurrently with the latest value storing site broadcasting processing A showing in FIG. 16B, the processing in step S1701 corresponds to the processing in step S1611 of FIG. 16B.

When it is determined in step S1701 that the prespecified period of time has passed, the broadcasting station site 101 refers to management information for particular copied data, and determines whether all the site IDs registered in the representative site ID information has been registered in the latest value storing site ID information or not (S1702: Corresponding to the site information transmitting step in the present invention).

When it is determined in step S1702 that all the site IDs registered in the representative site ID information have been registered in the latest value storing site ID information, the broadcasting station site 101 terminates the processing in FIG. 17.

On the other hand, when it is determined in step S1702 that all the site IDs registered in the representative site ID information have not been registered in the latest value storing site ID information, the broadcasting station site 101 transmits the latest value storing site broadcasting message not in the broadcasting mode, but through the communication line 107 only to the corresponding sites each with the site ID not having been registered (S1703: Corresponding to the site information transmitting step in the present invention). A format of the latest value storing site broadcasting message is the same as that of the latest value storing site broadcasting message distributed in the broadcasting mode in step S1612 in FIG. 16B.

For instance, if a site ID of the DB site 104 having been specified as a representative site for the object O has not been registered in the latest value storing site ID information, a latest value storing site broadcasting message is transmitted from the broadcasting station site 101 to the DB site 104.

Then a DB site having received the latest value storing site broadcasting message via the communication line 107 can copy the latest value for the corresponding copied data from other DB site storing the latest value therein according to the received latest value storing site broadcasting message or can store therein the latest value for copied data stored in a DB site having been specified as a representative site (Corresponding to the second copying step in the present invention). Then the DB site can transmit a message for reporting completion of receiving and updating to the broadcasting station site 101.

Figure 18:
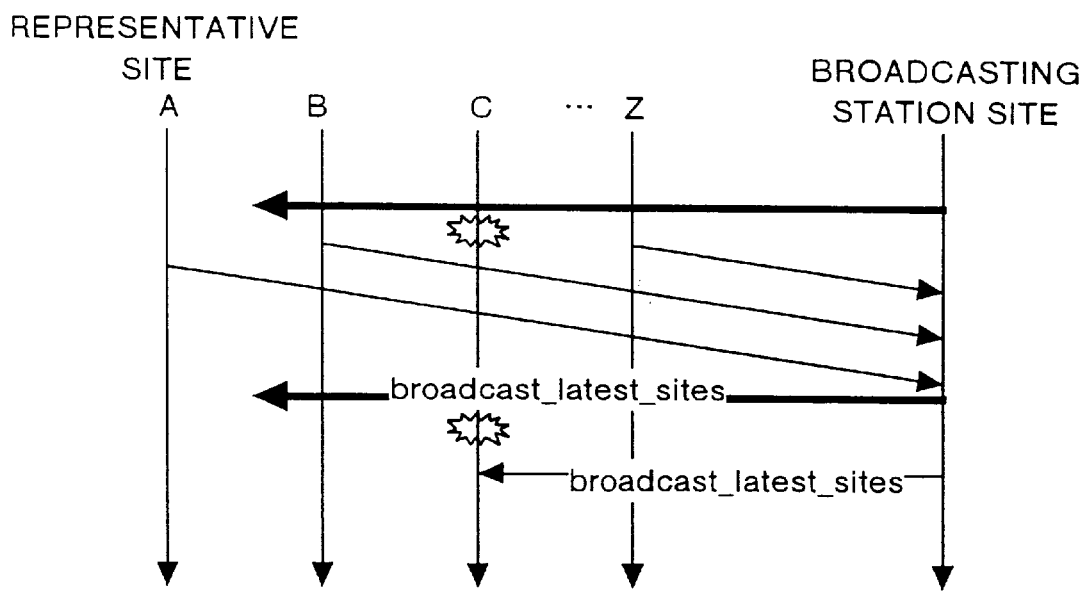
FIG. 18 is an explanatory view for illustrating a relation between the processing for reporting completion of receiving and updating at the broadcasting station site and the processing A and processing B for broadcasting a site storing therein the latest value in the broadcasting station site in the distributed type of database system according to Embodiment 2 of the present invention.

FIG. 18 is an explanatory view illustrating a relation among the processing for reporting completion of receiving executed in a DB site, the latest value storing site broadcasting processing A executed in a broadcasting station site, and the latest value storing site broadcasting processing B executed in a broadcasting station site. It is assumed herein that the representative sites A to Z shown in FIG. 18 have been specified as representative sites for the object O.

FIG. 18 shows a case in which, of the representative sites A to Z, only the representative site C has failed in receiving the commit message 300 indicating permission of updating of the object O. The representative sites other than the representative site Retransmitted a message for reporting completion of receiving to the broadcasting station site and also have received a latest value storing site broadcasting message distributed fin the broadcasting mode from the broadcasting station site. On the other hand, the representative site C has once more failed in receiving the latest value storing site broadcasting message. As a result, a latest value storing site broadcasting message is transmitted via the communication line from the broadcasting station site to the representative site C.

⑥ Functions and Roles of a DB Site

The DB sites 102 to 105 shown in FIG. 1 can be classified as follows from the viewpoint of the functions thereof. In other words, the DB sites can be classified into those having a function of requesting the updating of an object to the broadcasting station site 101 (updating function), and to those not having the updating function but having the function of receiving the commit message 300 addressed to a DB site having the updating function, namely the function for receiving the latest value for an object for copied data stored in the site (receiving function). Herein the former type of DB site is defined as an updating site, while the latter type of DB is defined as a receiving site.

When a particular object is taken into account, the DB sites 102 to 105 can further be classified into representative sites and ordinary sites other than the representative sites. Both an updating site and a receiving site can be specified as a representative site as described above, so that each DB site can be classified as a representative updating site, an ordinary updating site, a representative receiving site, or an ordinary receiving site for each object.

Figure 19:
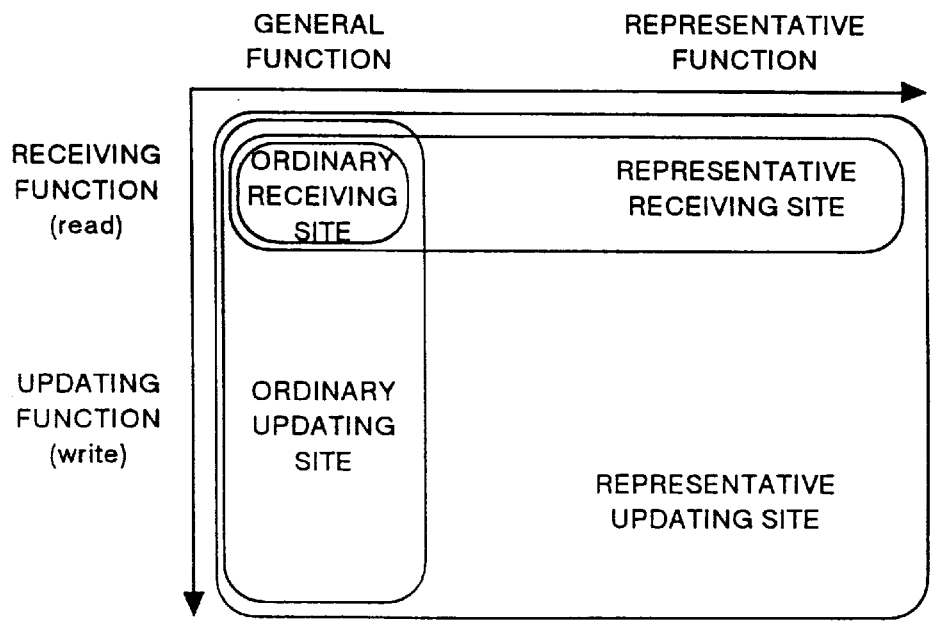
FIG. 19 is an explanatory view for illustrating a relation between functions owned by each DB site for a particular object in the distributed type of database system according to Embodiment 2 of the present invention.

FIG. 19 is an explanatory view showing a relationship between functions which the DB sites 102 to 105 have for a particular object. As clearly shown in FIG. 19, when attention is given to a particular object, each of the DB sites, which can be classified as representative updating sites, has all of the functions executable in each of the DB sites 102 to 105, and each of representative receiving sites as well as of ordinary updating sites have functions of an ordinary receiving site. When a DB site is specified as a representative site for an object, the DB site is put under management by the broadcasting station site 101 in relation to the object. On the other hand, an ordinary receiving site can not issue a request for updating the object, and only receives messages from the broadcasting station site 101, so that the site is not put under direct control by the broadcasting station site 101.

It should be noted that, in Embodiment 2, a DB site having been specified as a representative site for a particular object transmits a message for reporting completion of receiving and updating for the object and informs the broadcasting station site 101 of the fact that the latest value for the object is stored in the DB site. However, it is needless to say that all of DB sites may execute the processing for transmitting a message for reporting completion of receiving and updating without setting any representative site. However, when taking into consideration a work load no the broadcasting station site 101 in this case, it is preferable that not all of DB sites, but a limited number of representative sites are set.

(4) Effects According to Embodiment 2

With the distributed type of database system and the consistency managing method each according to Embodiment 2 of the present invention, when any of the DB sites 102 to 105 fails in receiving the commit message 300 or abort message 400 for a transaction generated in the site, the DB site can inquire the broadcasting station site 101 of the updating situation of the corresponding object, so that the DB site can easily determine whether the transaction is to be committed or aborted.

Also for each object existing in a system, a representative site for storing therein the latest value thereof is selected from among the DB sites 102 to 105, and when the DB site specified as a representative site for an object updates the corresponding copied data stored in the site to the latest value, the DB site transmits a message for reporting completion of receiving and updating to the broadcasting station site 101, and therefore, it is insured at least that the most updated information for the object exists in the system. Furthermore, even if the second site is not managing the most updated information for the object, it is possible to prevent generation of the situation where the most updated information for the object is lost from the system.

Furthermore, as the broadcasting station site 101 distributes a latest value storing site broadcasting message at a specified timing in the broadcasting mode to a first site, each of the DB sites 102 to 104 selects a DB site requiring a minimum access cost from the latest information storing site ID information in the distributed latest value storing site broadcasting message according to the necessity and easily obtain the most updated information for the object. In addition, by distributing the latest value storing site broadcasting message in the broadcasting mode, the broadcasting station site 101 can inform to any of the DB sites 102 to 105 of the fact that the DB site has failed in receiving the commit message 300 for an object. Further each of the Db sites 102 to 105 obtains the latest value for an object not from the broadcasting station site 101, but from other DB site, so that work load to the broadcasting station site 101 can be reduced.

Furthermore, broadcasting station site 101 identifies, of DB sites specified as representative site for a particular object, a DB site or DB sites not having transmitted a message for reporting completion of receiving and updating and transmit a latest value storing site broadcasting message to the identified DB site/s, so that the broadcasting station site 101 can notify the DB site/s that the DB site/s has failed in receiving the commit message 300 for the object for which the DB site or sites have been specified as representative ones. In addition, the DB site having received the latest value storing site broadcasting message select a DB site requiring minimum access cost from the latest information storing site ID information included in the received latest value storing site broadcasting message, so that the DB site can easily obtain the most updated information for the object. Furthermore, also in this case, each of the DB sites 102 to 105 obtains the latest value for the object not from the broadcasting station site .101, but from other DB site, so that a work load on the broadcasting station site 101 can be reduced.

Furthermore, latest information storing site ID information for an object is included in the abort message 400 or in the finally updated time stamp response message distributed in the broadcasting mode from the broadcasting station site 101, so that each of the DB sites 102 to 105 can select other site for which the access cost is minimum according to the latest information storing site ID information, and can easily obtain the latest value for the object. Each of the DB sites 102 to 105 can obtain the latest value of the object not from the broadcasting station site 101, but from the other DB site, so that work load to the broadcasting station site can be reduced.

Next, description is made for a case where the distributed type of database systems according to Embodiments 1 and 2 described above are actually constructed. FIG. 20 is an explanatory view showing an example of construction of a distributed type of database system, and with this system it is possible to construct an information broadcasting system, an electronic library system, a video-on-demand system or the like.

The broadcasting station site shown in FIG. 20 corresponds to the broadcasting station site 101 described in Embodiment 1 and Embodiment 2. The program producing site shown in FIG. 20 provides contents of a program to be broadcasted from the broadcasting station site. The intermediate DB site improves access efficiency in the entire system by cashing contents broadcasted from the broadcasting station site. The information terminal site accumulates contents broadcasted from the broadcasting station site at hole.

These sites corresponds to the DB sites 102 to 105 described in Embodiment 1 and Embodiment 2 respectively.

Also the DB retrieval site shown in FIG. 20 is used for retrieval of material in the program producing site or for retrieval of programs in the information terminal site.

For instance, information packages such as a magazine produced in the program producing site or a CD-ROM are distributed from the broadcasting station site. The information packages include, for instance, those like a town paper in a down town area in a metropolitan area, and the contents conceivably include information on movies, drams, a TV program table or the like. As the processing for updating generated in a system, addition or change of a schedule of performances in a picture theater or a time table thereof.

In a case of the broadcasting station site 101 described in Embodiment 1 and Embodiment 2, it may be considered that, in addition to the broadcasting station site shown in FIG. 20 the program producing site and DB retrieval site may also be included in the broadcasting station site. In other words, to which of the broadcasting station site 101 and the DB sites 102 to 105 in Embodiments 1 and 2 each of the sites shown in FIG. 29 correspond depends on the system designer's way of thinking, and FIG. 20 does not intend to fix the correspondence.

Further in FIG. 20, the program producing site corresponds to a updating site having the updating function, and the intermediate DB site and information terminal site each correspond to a receiving site having the receiving function (Refer to FIG. 19).

The consistency managing method for a distributed type of database system according to Embodiments 1 and 2 described above is realized by executing a prepared program with a computer (in the broadcasting station site 101 and DB sites 102 to 105) according to each flow chart. This program is recorded in a computer-readable recording medium such as a hard disk, a floppy disk, a CD-ROM, an MO, or a DVD, and is executed by reading out from the recording medium with a computer. In addition, the program can be distributed via the recording medium or a network.

As described above, a distributed type of database system according to the present invention comprises a one-to-one information transmitting unit for transmitting, when transaction is generated in the side of the plurality of first sites, updating permission request information for requiring permission of updating of the copied data for the arbitrary object stored therein from each of the plurality of first sites to the second site; and a one-to-many information transmitting unit for receiving the updating permission request information from the one-to-one information transmitting unit, determines whether the request for updating is to be permitted in the second site or not according to the received updated permission request information and management information for the object, and distributing a result of the determination from the second site to the plurality of sites in batch, so that a result of determination in the second site is simultaneously distributed to a plurality of first sites, and consistency management not causing any contradiction between data can be realized even in an extremely large scale distributed type of database system extending over an extremely large number of sites. In addition, it is not necessary for the second site to transmit a result of determination therein to each of a plurality of first sites respectively, so that work load to the second site can be reduced even in a case where centralized management in which only the second site can permit updating of data is employed.

In the distributed type of database system according to the present invention, in addition to the features described above, the one-to-one information transmitting unit is a communication line connected between the second site and the plurality of first sites for enabling transmission of the updating permission request information; and the one-to-many information transmitting unit is a broadcasting/distributing facility for distributing a result of the determination from the second site to the plurality of sites in the broadcasting mode, so that the system can be constructed by making use of existing facilities, which makes it possible to reduce the system cost and also to effectively utilize existing facilities.

A consistency managing method for a distributed type of database system according to the present invention comprises an updating permission requesting step of generating, when transaction is generated in one of the first sites, updating permission request information including information after updating for at least one object for which copied information is required to be updated, and transmitting the generated updated permission request information to the second site; an updating permission determining step of receiving the updating permission request information transmitted in the updating permission request step by the second site and making determination as to whether management information for the object is allowed to be updated or not according to the received message as well as to management information for the object; a updating permission/inhibition information generating step of updating, when it is determined in the updating permission determining step that management information for the object is allowed to be updated, management for the object, generating updating permission information including information for the objected after updating, and also generating, when it is determined in the updating permission determining step that the management information is not allowed to be updated, updating inhibition information; and a broadcasting/distributing step of distributing the updating permission information or updating inhibition information generated in the updating permission/inhibition information generating step from the second site to the plurality of first sites in the broadcasting mode, so that updating permission information or updating inhibition information from the second site is simultaneously distributed to a plurality of first sites and enhanced consistency management not causing contradiction between data can be provided even in an extremely large scale distributed type of database system extending over an extremely large number of DB sites. Furthermore, the second site is not required to transmit updating permission information or updating inhibition information to the plurality of first sites respectively, so that work load to the second site can be reduced even in a case where centralized management in which only the second site can permit updating of data is employed.

With the consistency managing method for a distributed type of database system according to the present invention, in addition to the features described above, the management information includes the latest time stamp for an object relating to copied data distributed among the plurality of first sites; a time stamp for an object requesting permission of updating is set in the updating permission information, when the updating permission information is generated, in the updating permission requesting step; and it is determines in the updating permission determining step whether updating is allowable or not according to a result of comparison of the time stamp set in the updating permission request information to the time stamp in the corresponding management information, so that the processing for determination can easily be executed.

The consistency managing method for a distributed type of database system according to the present invention further comprises a first updating step of updating, when, in any of the plurality of first sites, updating permission information for transaction generated in the site is received, corresponding copied data using information after updating stored in the site, and updating, when updating permission information for transaction generated in another one of the plurality of first sites is received, the corresponding copied data using information after updating included in the updating permission information; and a first aborting step of aborting, when, in any of the plurality of first sites, updating inhibition information for transaction generated in the site is received, the corresponding transaction, so that updating permission information or updating inhibition information is simultaneously distributed from a second site to a plurality of first sites and the corresponding copied data is simultaneously updated at the plurality of first sites, and therefore, enhanced consistency management not causing contradiction between data can be provided even in an extremely large scale distributed type of database system extending over an extremely large number of DB sites.

The consistency managing method for a distributed type of database system according to the present invention further comprises a first updating situation determining step of making determination, when, in any of the plurality of first sites, updating permission information for transaction generated in another one of the plurality of first sites is received, as to whether at least one of the objects required to be updated in transaction generated in the site has been already been updated in transaction generated in the other first site or not according to the received updating permission information; and a second aborting step of aborting, when it is determined in the first updating situation determining step that the at least one object has been updated in association with the transaction generated in the site, according to the received updating permission information, so that each of the first sites can check conflict in data updating while employing centralized management at the second site and also the corresponding transaction can be aborted before updating inhibition information is distributed from the second site, and therefore, the processing efficiency in each first site can be improved.

With the consistency managing method for a distributed type of database system according to the present invention, in the updating permission/inhibition generating step, when the updating permission information is generated, a point of time previously specified during or before generation of the updating permission information is set as a time stamp for an object allowed to be updated in the updating permission information as well as in the corresponding management information; and in the first updating situation determining step, it is determined whether at least one of the objected required to be updated has already been updated or not in transaction generated in the other first site, according to a result of comparison of the time stamp of the object required to be updated in transaction generated in the site to the corresponding time stamp in the updating permission information, so that the processing for determination can easily be executed.

The consistency managing method for a distributed type of database system according to the present invention further comprises a second updating situation determining step of making determination, when, in any of the plurality of first sites, the updating permission information is received before transmission of the updating permission request information, as to whether at least one of the objects required to be updated in transaction generated in the site has already been updated in the transaction generated in another one of the plurality of first sites or not according to the received updating permission information; and a third aborting step of aborting, when it is determined in the second updating situation determining step, the corresponding transaction in the first site, so that each of first sites can check conflict in data updating while employing centralized management by the second site and the corresponding transaction can be aborted before updating permission request information is transmitted to the second site, and therefore, a number of transactions aborted according to a result of determination by the second site can be reduced and the processing efficiency at the first sites as well as at the second site can be improved.

With the consistency managing method for a distributed type of database system according to the present invention, in the updating permission/inhibition information generating step, when the updating permission information is generated, a preset point of time during or before generation of the updating permission information is set as a time stamp for an object allowed to be updated in the updating permission information as well as in the corresponding management information, and in the second updating situation determining step, it is determined whether at least one of the objects required to be updated has already been updated in transaction generated in other first site or according to a result of comparison of the time stamp of an object required to be updated in transaction generated in the site to the corresponding time stamp in the updated permission information, so that the processing for determination can easily be executed.

The consistency managing method for a distributed type of database system according to the present invention further comprises an updating situation inquiring step of inquiring, when, in the first site having executed the updating permission requiring step and transmitted the updating permission requesting information to the second site, any of the updating permission information and updating inhibition information corresponding to the transmitted updating permission requesting information can not be received, updating situation of the object required to be updated at a specified timing; an updating situation transmitting step of generating, when an inquiry on updating situation is addressed from the first site, updating situation information according to management information for the corresponding object in the second site and transmitting the generated updating situation information only to the first site; an updating situation determining step of determining, when the updating situation information is received, whether updating of the corresponding object has been allowed according to the received updating situation information; a second updating step of updating, when it is determined in the updating situation determining step that updating has been allowed in the first site, the corresponding data using information after updating stored in the site; and a fourth aborting step of aborting, when it is determined in the updating situation determining step that updating has not been allowed in the first site, the corresponding transaction, so that a DB site having requested permission of updating an object can correctly determine, even when the DB site fails in receiving updating permission information or updating inhibition information distributed in the broadcasting mode from the second site, as to whether the corresponding transaction is to be committed or to be aborted.

The consistency managing method for a distributed type of database system according to the present invention further comprises a representative site specifying step of specifying at least one first site as a representative site for storing therein the latest information of an object for copied data existing in the system; an updated information transmitting step of transmitting, when, in the first site specified as a representative site, the corresponding data in the site is updated to the latest information, updated information including a site identification information for the site and indicating that the copied data for the object has been updated to the second site; and a site information registering/managing step of registering site identification information included in the received updated information in a latest information storing site prepared as one of management information for the object for management, so that existence of the most updated information for a particular object in the system is always insured. Therefore, even in a case where a system in which the most updated information for an object is not put under management by the second site, loss of the most updated information for the object from the system can be prevented. In addition, a required number of representative sites are specified from a plurality of first sites for each object, so that a work load on the second site can be reduced.

With the consistency managing method for a distributed type of database system according to the present invention, in the representative site specifying step, at least one representative site for storing therein the latest information is specified from the plurality of first sites for each object for copied data existing in a system, and site identification information for the first site specified as a representative site is registered in representative site information prepared as one of management information for the object, so that existence of the most updated information for each object in the system is always insured. Furthermore, representative sites are specified for each object, and a site is not required to store therein the most updated information for all objects, so that management cost at a first site can be reduced.

The consistency managing method for a distributed type of database system according to the present invention further comprises an updated information managing step of preserving information after updating for an object included in the updating permission requesting information when updating is allowed in the updating permission determining step, and aborting the update information for the object when the updated information is received from at least one of the representative sites, so that management cost for an object at the second site can be reduced. In addition, as existence of the most updated information for a particular object in the system is insured by a representative site or site, so that a problem does not occur even if the second site destroys the information after updating.

The consistency managing method for a distributed type of database system according to the present invention further comprises a site information distributing step of distributing the latest information storing site information at a specified timing from the second site to the plurality of first sites; and a copying step of selecting one first site from the distributed latest information storing site information according to the necessity when the latest information storing site information is received in the first site and copying the latest information for the corresponding object from the selected first site, so that each first site can detect that the site has failed in receiving updating permission information for the corresponding object by receiving latest information storing site information. Furthermore, the latest information storing site information includes information concerning a first site storing therein the most updated information for the corresponding object, so that each of first sites can easily obtain the most updated information for the object by selecting a first site requiring minimum access cost. In addition, each first site obtains the latest value for an object not from the second site, but from other first site, so that work load to the second site can be reduced.

The consistency managing method for a distributed type of database system according to the present invention further comprises a site information transmitting step of identifying a first site not having transmitted the updated information from among the first sites specified as representative sites for a specified objected at a specified timing in the second site according to the representative site information as well as to the latest information storing site information and transmitting the latest information storing site information for the identified object only to the identified first site; and a second copying step of selecting one first site from the received latest information storing site information when the latest information storing site information is received in the first site specified as a representative site, and copying the latest information for the object from the selected first site, so that existence of the most updated information for each object in a system can always be insured, and the first site can be informed of the fact that the site has failed in receiving the updating permission information for a particular object. Furthermore, the latest information storing information includes information concerning a first site or site each storing therein the most updated information for the corresponding object, so that first sites specified as representative site can easily obtain the most updated information for the object by selecting a first site requiring minimum access cost. In addition, the first site specified as a representative site obtains the latest value for the corresponding object not from the second site, but from other first site, so that a work load on the second site can be reduced.

With the consistency managing method for a distributed database system according to the present invention, the updating permission/inhibition information generating step further comprises a third step of setting, when generating the updating inhibition information, the latest information storing site information for the object in the updating inhibition information, further setting, when the corresponding transaction is aborted in the first, second and third aborting steps in the first site, one site from the latest information storing site information included in the updating inhibition information, and copying the last information for the corresponding object from the selected first site, so that each DB site can easily obtain the most updated information for the object. In addition, each of first sites obtain the latest value for the object not from the second site, but from other first site, so that a work load on the second site can be reduced.

With the consistency managing method for a distributed type of database system according to the present invention, the updating situation transmitting step further comprises a fourth copying step of setting, when generating the updating situation information, latest information storing site information for the corresponding object in the updating situation information, selecting, when the corresponding transaction is aborted in the fourth aborting step in the first site, one of the first sites from the latest information storing site included in the updating situation information, and copying the latest information for the corresponding object from the selected first site, so that each DB site can easily obtain the most updated information for the corresponding object by selecting a first site requiring the minimum access cost. In addition, each of first sites obtain the latest value for the object not from the second site, but from other first site, so that a work load on the second site can be reduced.

The consistency managing method for a distributed type of database system according to the present invention further comprises a clock signal distributing step of generating a clock signal for unifying a clock for a system as a whole in the second site and distributing the generated clock signal to the plurality of first sites in the broadcasting mode, and in the updating permission/inhibition information, a time stamp for an object having been allowed to be updated is generated using the clock signal, the generated time stamp is set in the updating permission information as well as in the management information, and in the first updating step, the time stamp in the updating permission information is set as a time stamp for the corresponding copied data, so that copied data distributed over a system can be managed according to common time clock even in an extremely large scale distributed type of database system extending over an extremely large number of sites, and therefore, it is possible to solve the problem such that the consistency among data can not be maintained due to difference between time clock at a plurality of first sites and a second site.

With the consistency managing method for a distributed type of database system according to the present invention, in the updating situation transmitting step, a time stamp set in management information for the corresponding object is set in the updating situation information, and in the second updating step, the time stamp in the updating situation information is set as a time stamp for the corresponding copied data, so that copied data distributed over a system can be managed according to common time clock even in an extremely large scale distributed type of database system extending over an extremely large number of sites, and therefore, it is possible to solve a problem such that the consistency among data can not be maintained due to difference between time clock at a plurality of first sites and a second site.

With the consistency managing method for a distributed type of database system according to the present invention, in the first updating step, when the corresponding copied data is updated according to the updating permission information, the copied data is updated on the condition that preset conditions for updating are satisfied, that the processing for updating can be executed according to a type of copied data stored in each first site or use thereof.

With a computer-readable recording medium according to the present invention, a program for making a computer execute each step of the consistency managing method for a distributed type of database system is recorded therein, so that enhanced consistency managing method not causing data contradiction among data in a system can be provided even in an extremely large scale distributed type of database system extending over an extremely large number of database site.

This application is based on Japanese patent applications No. HEI 9-343394 and No. HEI 10-116451 filed in the Japanese Patent Office on Dec. 12, 1997 and Apr. 27, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A distributed type of database system comprising:
   a plurality of first sites each having copied data for an arbitrary object;
   a second site that is different from the first sites and that is configured to centrally manage consistency of the copied data distributed among said first sites according to management information for managing the object;
   a one-to-one information transmitting unit configured to transmit, when a transaction is generated in the said first sites, updating permission request information for requiring permission of updating of the copied data for the arbitrary object stored therein from each of said first sites to said second site; and
   a one-to-many information transmitting unit configured to receive the updating permission request information from said one-to-one information transmitting unit, to determine whether the request for updating is to be permitted by said second site or not according to the received updating permission request information and management information for the object, and to broadcast a result of the determination from said second site to said first sites.

2. A distributed type of database system according to claim 1, wherein:
   said one-to-one information transmitting unit is a communication line connecting said second site and said first sites configured to enable transmission of the updating permission request information; and
   said one-to-many information transmitting unit is a broadcasting/distributing facility configured to distribute a result of the determination from said second site to said first sites in a broadcasting mode.

3. A consistency managing method for a distributed type of database system, which database system has a plurality of first sites each having copied data for an arbitrary object therein and a second site, different from the first sites, and configured to centrally manage consistency of copied data distributed among said first sites according to management information for managing the object, said method comprising:
   an updating permission requesting step of generating, when a transaction is generated in one of said first sites, updating permission request information including information after updating for at least one object for which copied information is required to be updated, and transmitting the generated updating permission request information to said second site;
   an updating permission determining step of receiving the updating permission request information transmitted in the updating permission requesting step by said second site and determining whether management information for the object is allowed to be updated or not according to the received updating permission request information as well as to management information for the object;
   an updating permission/inhibition information generating step of updating, when it is determined in the updating permission determining step that management information for the object is allowed to be updated, management information for the object, generating updating permission information including information for the object after updating, and also generating, when it is determined in the updating permission determining step that the management information is not allowed to be updated, updating inhibition information; and
   a broadcasting/distributing step of distributing the updating permission information or updating inhibition information generated in the updating permission/inhibition information generating step from said second site to said first sites in a broadcasting mode.

4. A consistency managing method for a distributed type of database system according to claim 3, wherein:

said management information includes a latest time stamp for an object related to the copied data distributed among said first sites;

in the updating permission requesting step a time stamp for an object requesting permission for updating is set in the updating permission request information when the updating permission request information is generated; and in the updating permission determining step it is determined whether updating is allowable or not according to a result of comparison of the time stamp set in the updating permission request information to the time stamp in the corresponding management information.

5. A consistency managing method for a distributed type of database system according to claim 3 further comprising:

a first updating step of updating corresponding copied data using information after updating stored in the site when any of said first sites receives updating permission information for transaction generated in that site itself, and updating the corresponding copied data using information after updating included in the updating permission information when any of said first sites receives updating permission information for a transaction generated in some other first site; and a first aborting step of aborting the corresponding transaction when any of said first sites receives an updating inhibition information for a transaction generated in the site.

6. A consistency managing method for a distributed type of database system according to claim 5 further comprising:

a first updating situation determining step of determining, when, in any of said first sites, updating permission information for transaction generated in the other first site is received, as to whether at least one of the objects required to be updated in transaction generated in the site has been already been updated in transaction generated in the other first site or not according to the received updating permission information;

a second aborting step of aborting, when it is determined in the first updating situation determining step that the at least one object has been updated in association with the transaction generated in the site, according to the received updating permission information.

7. A consistency managing method for a distributed type of database system according to claim 6; wherein, in the updating permission/inhibition generating step, when the updating permission information is generated, a point of time previously specified during or before generation of the updating permission information is set as a time stamp for an object allowed to be updated in the updating permission information as well as in the corresponding management information; and in the first updating situation determining step, it is determined whether at least one of the objected required to be updated has already been updated or not in transaction generated in the other first site, according to a result of comparison of the time stamp of the object required to be updated in transaction generated in the site to the corresponding time stamp in the updating permission information.

8. A consistency managing method for a distributed type of database system according to claim 5, further comprising:

a second updating situation determining step of determining, when, in any of said first sites, the updating permission information is received before transmission of the updating permission request information, whether at least one of the objects required to be updated in transaction generated in the site has already been updated in the transaction generated in other first site or not according to the received updating permission information; and a third aborting step of aborting, when it is determined in the second updating situation determining step, the corresponding transaction in the first site.

9. A consistency managing method for a distributed type of database system according to claim 8; wherein, in the updating permission/inhibition information generating step, when the updating permission information is generated, a preset point of time during or before generation of the updating permission information is set as a time stamp for an object allowed to be updated in the updating permission information as well as in the corresponding management information, and in the second updating situation determining step, it is determined whether at least one of the objects required to be updated has already been updated in transaction generated in other first site or according to a result of comparison of the time stamp of an object required to be updated in transaction generated in the site to the corresponding time stamp in the updated permission information.

10. A consistency managing method for a distributed type of database system according to claim 5 further comprising:

an updating situation inquiring step of inquiring, when, in the first site having executed the updating permission requiring step and transmitted the updating permission requesting information to the second site, any of the updating permission information and updating inhibition information corresponding to the transmitted updating permission requesting information can not be received, updating situation of the object required to be updated at a specified timing;

an updating situation transmitting step of generating, when an inquiry on updating situation is addressed from the first site, updating situation information according to management information for the corresponding object in the second site and transmitting the generated updating situation information only to the first site;

an updating situation determining step of determining, when the updating situation information is received, whether updating of the corresponding object has been allowed according to the received updating situation information;

a second updating step of updating, when it is determined in the updating situation determining step that updating has been allowed in the first site, the corresponding data using information after updating stored in the site; and a fourth aborting step of aborting, when it is determined in the updating situation determining step that updating has not been allowed in the first site, the corresponding transaction.

11. A consistency managing method for a distributed type of database system according to claim 5 further comprising:

a representative site specifying step of specifying at least one first site as a representative site for storing therein the latest information of an object for copied data existing in the system;

an updated information transmitting step of transmitting, when, in the first site specified as a representative site, the corresponding data in the site is updated to the latest information, updated information including a site identification information for the site and indicating that the copied data for the object has been updated to the second site; and a site information registering/managing information for registering site identification information included in the received updated information in a latest information storing site prepared as one of management information for the object for management.

12. A consistency managing method for a distributed type of database system according to claim 11, wherein, in the representative site specifying step:

at least one representative site for storing therein the latest information is specified from the plurality of first sites for each object for copied data existing in a system, and site identification information for the first site specified as a representative site is registered in representative site information prepared as one of management information for the object.

13. A consistency managing method for a distributed type of database system according to claim 11 further comprising:

an updated information managing step of preserving information after updating for an object included in the updating permission requesting information when updating is allowed in the updating permission determining step, and aborting the update information for the object when the updated information is received from at least one of the representative sites.

14. A consistency managing method for a distributed type of database system according to claim 11 further comprising:

a site information distributing step of distributing the latest information storing site information at a specified timing from the second site to said first sites; and a copying step of selecting one first site from the distributed latest information storing site information according to the necessity when the latest information storing site information is received in the first site and copying the latest information for the corresponding object from the selected first site.

15. A consistency managing method for a distributed type of database system according to claim 11 further comprising:

a site information transmitting step of identifying a first site not having transmitted the updated information from among the first sites specified as representative sites for a specified objected at a specified timing in the second site according to the representative site information as well as to the latest information storing site information and transmitting the latest information storing site information for the identified object only to the identified first site; and a second copying step of selecting one first site from the received latest information storing site information when the latest information storing site information is received in the first site specified as a representative site, and copying the latest information for the object from the selected first site.

16. A consistency managing method for a distributed database system according to claim 11; wherein said updating permission/inhibition information generating step further comprises a third step of setting, when generating the updating inhibition information, the latest information storing site information for the object in the updating inhibition information, further setting, when the corresponding transaction is aborted in the first, second and third aborting steps in the first site, one site from the latest information storing site information included in the updating inhibition information, and copying the last information for the corresponding object from the selected first site.

17. A consistency managing method for a distributed type of database system according to claim 11; wherein said updating situation transmitting step further comprises a fourth copying step of setting, when generating the updating situation information, latest information storing site information for the corresponding object in the updating situation information, selecting, when the corresponding transaction is aborted in the fourth aborting step in the first site, one of the first sites from the latest information storing site included in the updating situation information, and copying the latest information for the corresponding object from the selected first site.

18. A consistency managing method for a distributed type of database system according to claim 5, further comprising:

a clock signal distributing step of generating a clock signal for unifying a clock for a system as a whole in the second site and distributing the generated clock signal to said first sites in the broadcasting mode; wherein, in said updating permission/inhibition information generating step, a time stamp for an object having been allowed to be updated is generated using the clock signal, the generated time stamp is set in the updating permission information as well as in the management information, and in the first updating step, the time stamp in the updating permission information is set as a time stamp for the corresponding copied data.

19. A consistency managing method for a distributed type of database system according to claim 10, wherein, in said updating situation transmitting step a time stamp set in management information for the corresponding object is set in the updating situation information, and in the second updating step the time stamp in the updating situation information is set as a time stamp for the corresponding copied data.

20. A consistency managing method for a distributed type of database system according to claim 5; wherein, in said first updating step, when the corresponding copied data is updated according to the updating permission information, the copied data is updated on the condition that preset conditions for updating are satisfied.

21. A computer-readable recording medium with a program for making a computer execute each step in the consistency managing method for a distributed type of database system according to claim 3.

* * * * *

UNITED STATES PATENT AND TRADEMARK OFFICE
CERTIFICATE OF CORRECTION

PATENT NO. : 6,286,004 B1  Page 1 of 1
DATED : September 4, 2001
INVENTOR(S) : Yukari Yoshiura et al.

It is certified that error appears in the above-identified patent and that said Letters Patent is hereby corrected as shown below:

<u>Title page,</u>
Item [73], the Assignee information should read:

-- [73] Assignees: Information Broadcasting Laboratories, Inc., ; Ricoh Company, Ltd.; both of Tokyo (JP) --

Signed and Sealed this

Fifth Day of February, 2002

*Attest:*

JAMES E. ROGAN
*Attesting Officer*   *Director of the United States Patent and Trademark Office*